United States Patent
Kim et al.

(10) Patent No.: US 10,638,437 B2
(45) Date of Patent: Apr. 28, 2020

(54) METHOD AND APPARATUS FOR TRANSMITTING AND RECEIVING SYNCHRONIZATION SIGNAL BLOCK

(71) Applicant: LG Electronics Inc., Seoul (KR)

(72) Inventors: Youngsub Kim, Seoul (KR); Hyunsoo Ko, Seoul (KR); Kijun Kim, Seoul (KR); Sukhyon Yoon, Seoul (KR); Eunsun Kim, Seoul (KR); Haewook Park, Seoul (KR)

(73) Assignee: LG Electroincs Inc., Seoul (KR)

( * ) Notice: Subject to any disclaimer, the term of this patent is extended or adjusted under 35 U.S.C. 154(b) by 0 days.

(21) Appl. No.: 16/065,737

(22) PCT Filed: Jun. 7, 2018

(86) PCT No.: PCT/KR2018/006448
§ 371 (c)(1),
(2) Date: Oct. 21, 2019

(87) PCT Pub. No.: WO2018/230879
PCT Pub. Date: Dec. 20, 2018

(65) Prior Publication Data
US 2020/0053671 A1    Feb. 13, 2020

Related U.S. Application Data

(60) Provisional application No. 62/561,153, filed on Sep. 20, 2017, provisional application No. 62/558,872, (Continued)

(51) Int. Cl.
*H04W 4/00* (2018.01)
*H04W 56/00* (2009.01)
(Continued)

(52) U.S. Cl.
CPC ......... *H04W 56/001* (2013.01); *H04L 5/0007* (2013.01); *H04L 5/0042* (2013.01); *H04W 72/042* (2013.01)

(58) Field of Classification Search
CPC . H04W 56/001; H04W 5/007; H04W 5/0042; H04W 72/042; H04W 4/00;
(Continued)

(56) References Cited

U.S. PATENT DOCUMENTS

2015/0181543 A1   6/2015   Hwang et al.
2016/0088621 A1   3/2016   Lee et al.
(Continued)

FOREIGN PATENT DOCUMENTS

JP       5021718        9/2012
KR     1020080031658    4/2008
(Continued)

OTHER PUBLICATIONS

United States Notice of Allowance in U.S. Appl. No. 16/299,652, dated Jun. 12, 2019, 14 pages.
(Continued)

*Primary Examiner* — Stephen M D Agosta
(74) *Attorney, Agent, or Firm* — Fish & Richardson P.C.

(57) ABSTRACT

The present disclosure provides a method for receiving a synchronization signal block by a UE in a wireless communication system. Particularly, the method includes receiving at least one SSB mapped to a plurality of symbols, wherein two regions for candidate SSBs in which the at least one SSB can be received are allocated in a specific time duration including the plurality of symbols, and a time between the two regions, a time before the two regions and a time after the two regions are identical in the specific time duration.

9 Claims, 31 Drawing Sheets

Related U.S. Application Data filed on Sep. 15, 2017, provisional application No. 62/542,207, filed on Aug. 7, 2017, provisional application No. 62/542,209, filed on Aug. 7, 2017, provisional application No. 62/520,705, filed on Jun. 16, 2017, provisional application No. 62/520,451, filed on Jun. 15, 2017.

(51) Int. Cl.
*H04W 72/04* (2009.01)
*H04L 5/00* (2006.01)

(58) Field of Classification Search
CPC ... H04L 5/0048; H04L 5/0053; H04L 5/0055; H04L 5/001; H04L 5/0051; H04L 5/0007; H04B 7/0695; H04B 7/088; H04B 7/0617; H04B 7/04; H04B 7/0417; H04B 7/0639

See application file for complete search history.

(56) References Cited

U.S. PATENT DOCUMENTS

| | | | |
|---|---|---|---|
| 2017/0094624 A1* | 3/2017 | Balachandran | H04W 56/00 |
| 2017/0251460 A1* | 8/2017 | Agiwal | H04W 72/0406 |
| 2018/0070341 A1 | 3/2018 | Islam et al. | |
| 2018/0279380 A1* | 9/2018 | Jung | H04W 74/0833 |
| 2018/0376438 A1 | 12/2018 | Islam et al. | |
| 2018/0376454 A1 | 12/2018 | Åström et al. | |
| 2019/0037481 A1 | 1/2019 | Zhang et al. | |
| 2019/0037509 A1 | 1/2019 | Li et al. | |
| 2019/0052434 A1* | 2/2019 | Zhou | H04L 5/0053 |

FOREIGN PATENT DOCUMENTS

| | | |
|---|---|---|
| KR | 100859716 | 9/2008 |
| WO | WO2016148530 | 9/2016 |
| WO | WO2018230879 | 12/2018 |

OTHER PUBLICATIONS

Etri, "NR SS block and burst set composition," 3GPP TSG RAN WG1 Meeting #88bis, dated Apr. 3-7, 2017, 5 pages.

NTT Docomo Inc, "Discussion on SS block composition, SS burst set composition and SS block index indication for NR," 3GPP TSG RAN WG1 Meeting #88bis, dated Apr. 3-7, 2017, 8 pages.

LG Electronics, "Discussion on SS block composition and SS burst set composition," 3GPP TSG RAN WG1 Meeting #89, dated May 15-19, 2017, 8 pages.

Office Action in Korean Application No. 10-2018-0065329, dated Jun. 25, 2018, 11 pages (with English Translation).

Decision to Grant in Korean Application No. 10-2018-0065329, dated Aug. 1, 2018, 4 pages (with English Translation).

Australian Office Action in Australian Application No. 2018283571, dated Jan. 7, 2020, 3 pages.

Japanese Office Action in Japanese Application No. 2019-503446, dated Jan. 14, 2020, 7 pages (with English translation).

NTT Docomo, Inc., "Discussion on SS block composition and SS burst set composition," R11708437, 3GPP TSG RAN WG1 Meeting #89, Hangzhou, P.R. China, dated May 15-19, 2017, 5 pages.

United States Notice of Allowance in U.S. Appl. No. 16/529,346, dated Dec. 18, 2019, 18 pages.

* cited by examiner

FIG. 1
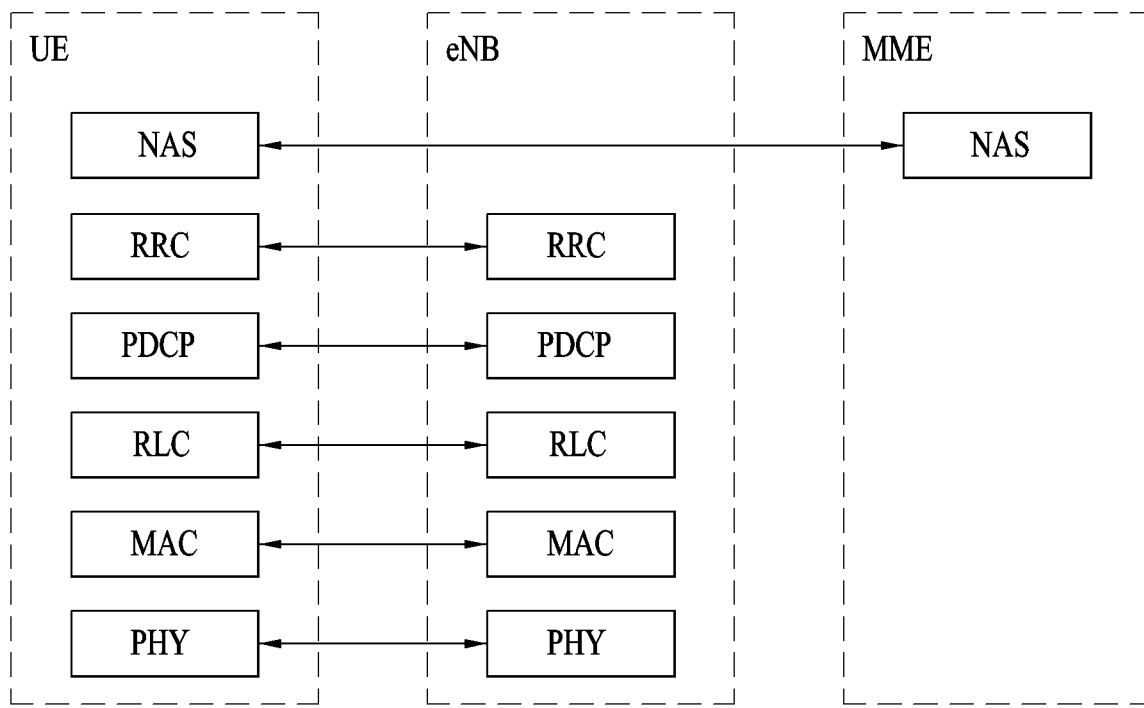
(A) CONTROL-PLANE PROTOCOL STACK
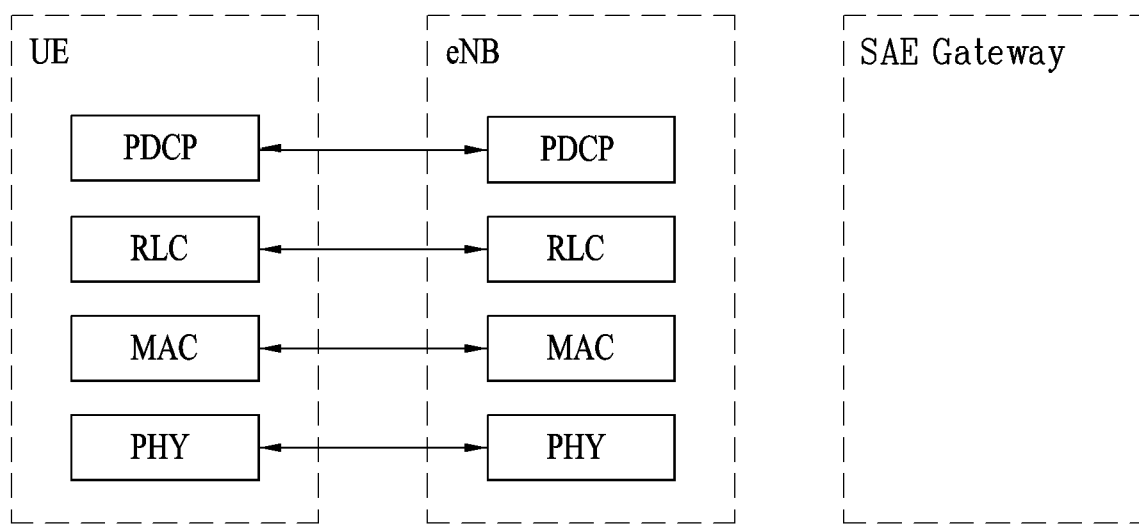
(B) USER-PLANE PROTOCOL STACK FIG. 9
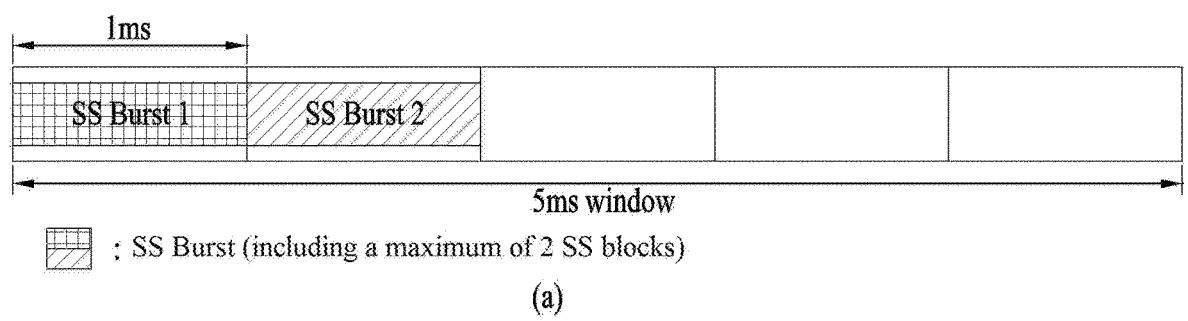
(a)
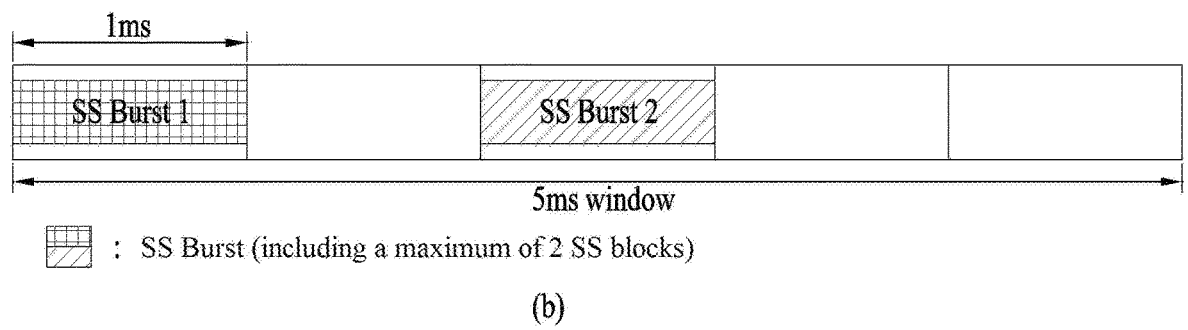
(b)

FIG. 10
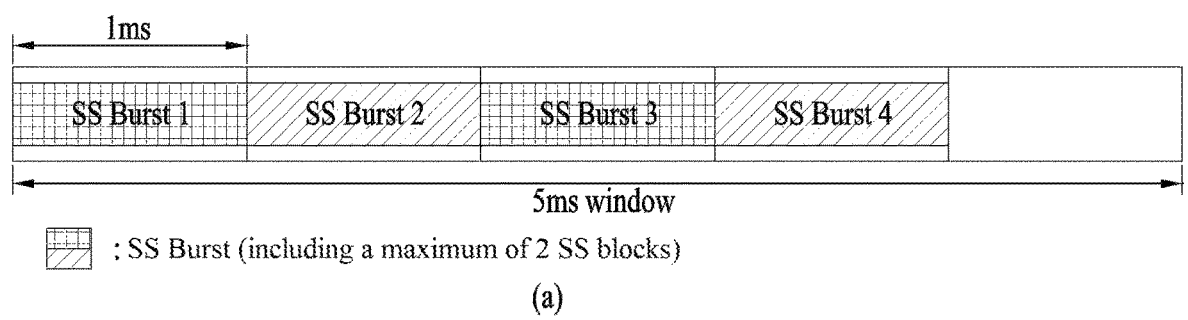
(a)
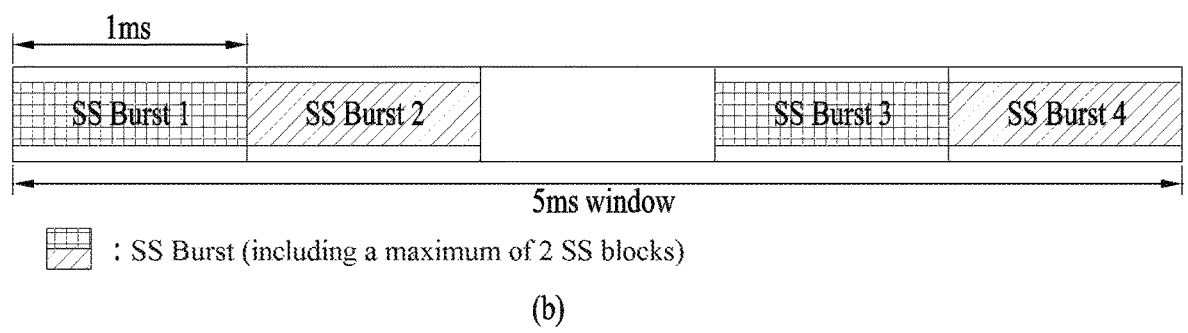
(b)

FIG. 11
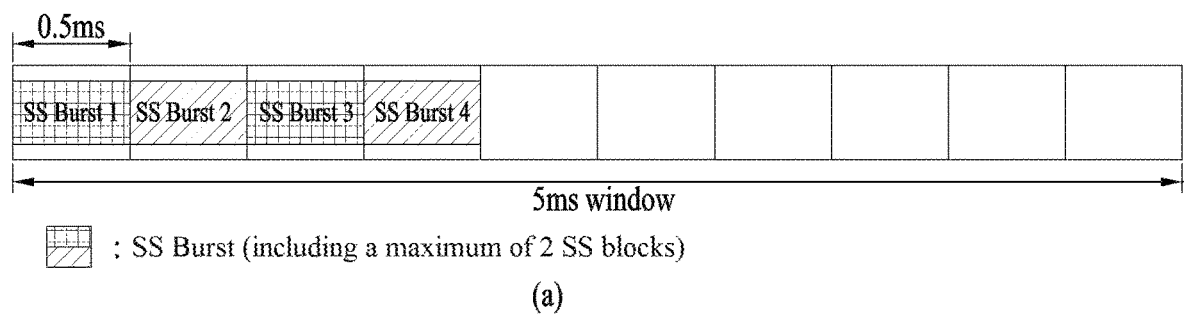
(a)
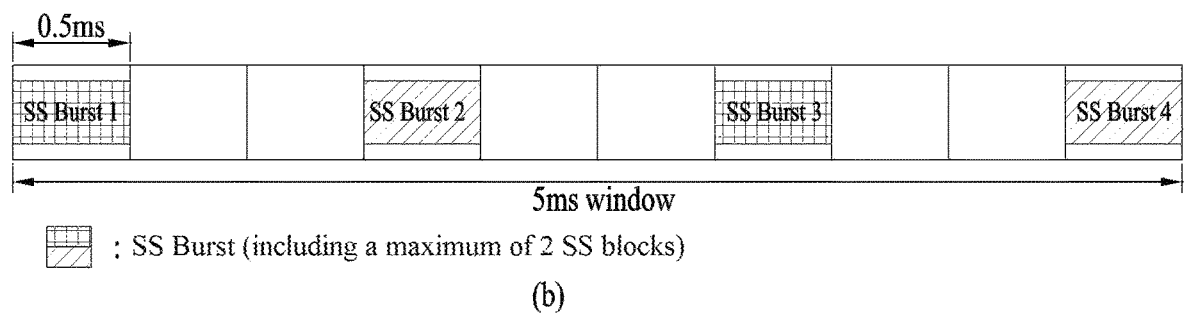
(b)

FIG. 12
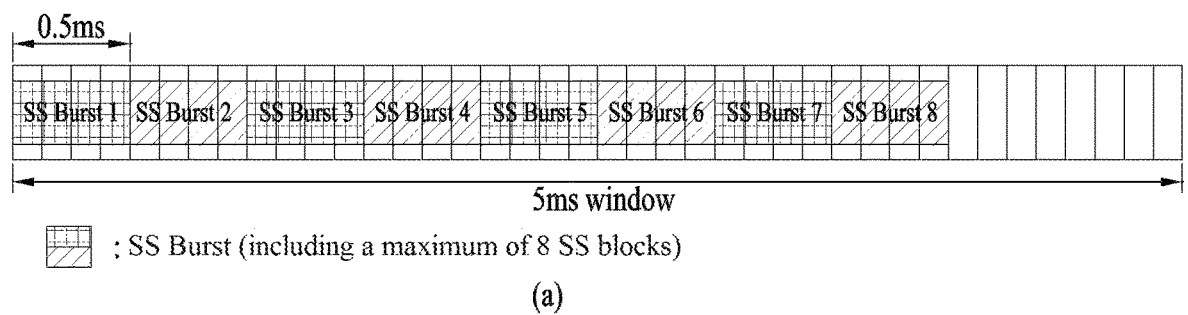
(a)
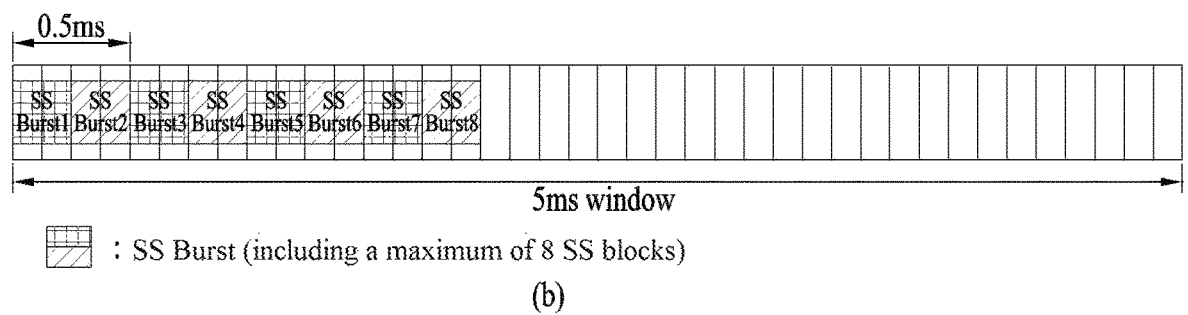
(b)

FIG. 13
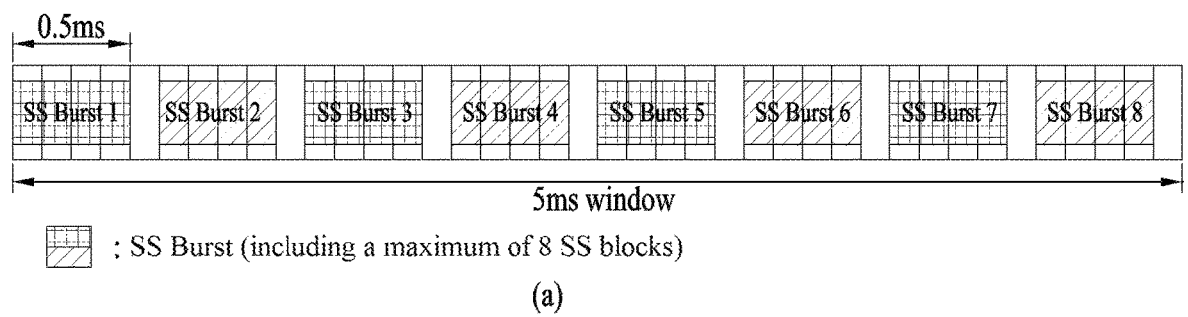
(a)
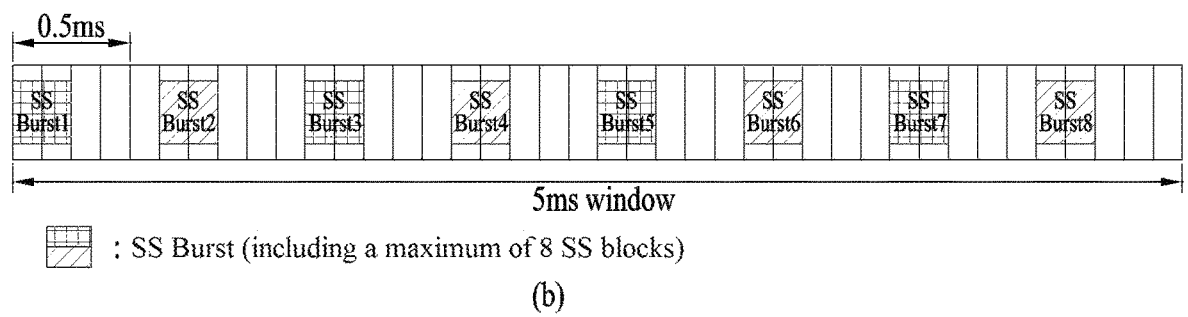
(b)

FIG. 31

| Bit for SSB Group Indication | Bit for actual transmit SSB indication in SSB Group |
|---|---|
| 0 0 0 0 0 0 0 | ☐ ☐ ... ☐ |

METHOD AND APPARATUS FOR TRANSMITTING AND RECEIVING SYNCHRONIZATION SIGNAL BLOCK

TECHNICAL FIELD

The present disclosure relates to a method for transmitting and receiving a synchronization signal block and an apparatus therefor, and more specifically, to a method for varying positions at which a synchronization signal block can be transmitted when a numerology for the synchronization signal block differs from a numerology for data to transmit and receive the synchronization signal block and an apparatus therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method for transmitting and receiving a synchronization signal block and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

A method for receiving a synchronization signal block (SSB) by a UE in a wireless communication system according to an embodiment of the present disclosure includes receiving at least one SSB mapped to a plurality of symbols, wherein two regions for candidate SSBs in which the at least one SSB can be received are allocated in a specific time duration including the plurality of symbols, wherein a time between the two regions, a time before the two regions and a time after the two regions are identical in the specific time duration.

Here, the candidate SSBs may be consecutively disposed by a first number in each of the two regions.

Further, 4 symbols may be included in the identical time when a subcarrier spacing of the SSB is a first value, and 8 symbols may be included in the identical time when the subcarrier spacing of the SSB is a second value.

Further, the regions for the candidate SSBs may be consecutively disposed by a second number in units of the specific time duration in a half frame and then consecutively disposed again by the second number after a predetermined time.

Further, the regions for the candidate SSBs may be consecutively disposed by the second number in units of the specific time duration when the subcarrier spacing of the SSB is the first value, the regions being repeatedly disposed four times at an interval of the predetermined time.

Further, the number of slots included in the predetermined time may be 2 when the subcarrier spacing of the SSB is the first value and the number of slots included in the predetermined time may be 4 when the subcarrier spacing of the SSB is the second value.

Further, a frequency band in which the UE operates may be equal to or greater than a specific value.

Further, the identical time may be composed of two symbols.

Further, the specific time duration in which the two regions are allocated may be repeatedly disposed by a specific number determined on the basis of the frequency band in which the UE operates in a localized manner in a half frame.

Further, the specific number may be 2 when the frequency band in which the UE operates is equal to or less than the specific value and 4 when the frequency band in which the UE operates is greater than the specific value.

A UE receiving a synchronization signal block (SSB) in a wireless communication system according to the present disclosure includes: a transceiver for transmitting/receiving signals to/from a base station; and a processor connected to the transceiver to control the transceiver to receive at least one SSB mapped to a plurality of symbols, wherein two regions for candidate SSBs in which the at least one SSB can be received are allocated in a specific time duration including the plurality of symbols, wherein a time between the two regions, a time before the two regions and a time after the two regions are identical in the specific time duration.

A method for transmitting a synchronization signal block (SSB) by a base station in a wireless communication system according to an embodiment of the present disclosure includes transmitting at least one SSB mapped to a plurality of symbols, wherein two regions for candidate SSBs in which the at least one SSB can be received are allocated in a specific time duration including the plurality of symbols, wherein a time between the two regions, a time before the two regions and a time after the two regions are identical in the specific time duration.

A base station transmitting a synchronization signal block (SSB) in a wireless communication system according to the present disclosure includes: a transceiver for transmitting/receiving signals to/from a UE; and a processor connected to the transceiver to control the transceiver to transmit at least one SSB mapped to a plurality of symbols, wherein two regions for candidate SSBs in which the at least one SSB can be received are allocated in a specific time duration including the plurality of symbols, wherein a time between the two regions, a time before the two regions and a time after the two regions are identical in the specific time duration.

Advantageous Effects

According to the present disclosure, it is possible to efficiently perform control information transmission and reception for data transmission even a numerology for a synchronization signal block differs from a numerology for data.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIGS. 9 to 14 show examples of configuring SS bursts according to a subcarrier spacing of SSBs.

FIGS. 30 and 31 show examples of indicating ATSSs among candidate SSBs.

BEST MODE

Figure 2:
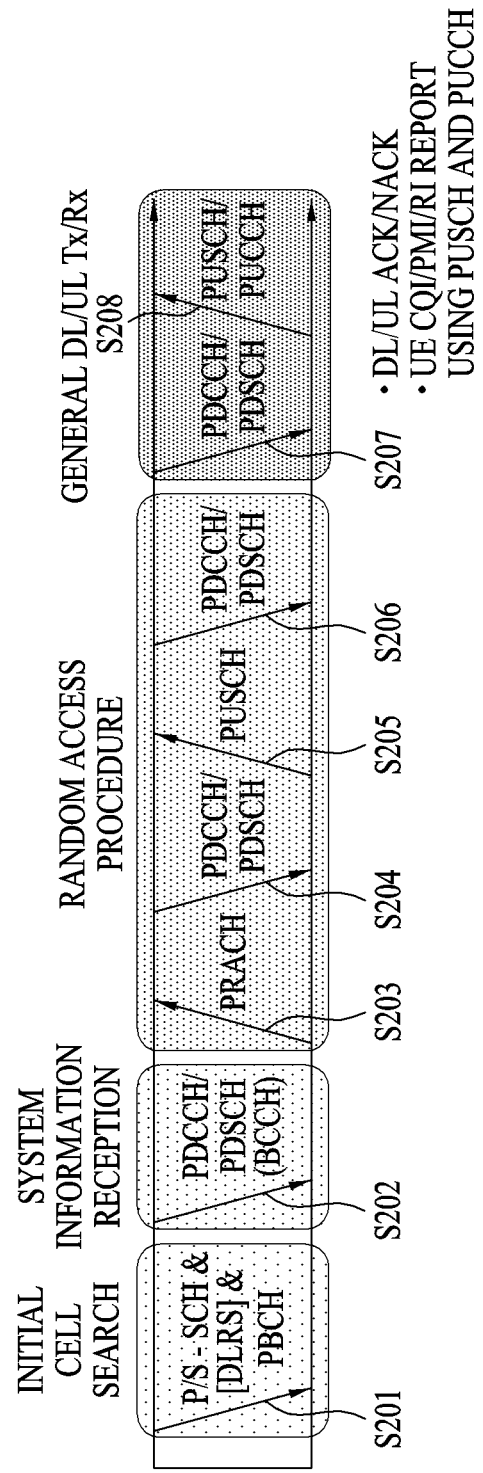
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
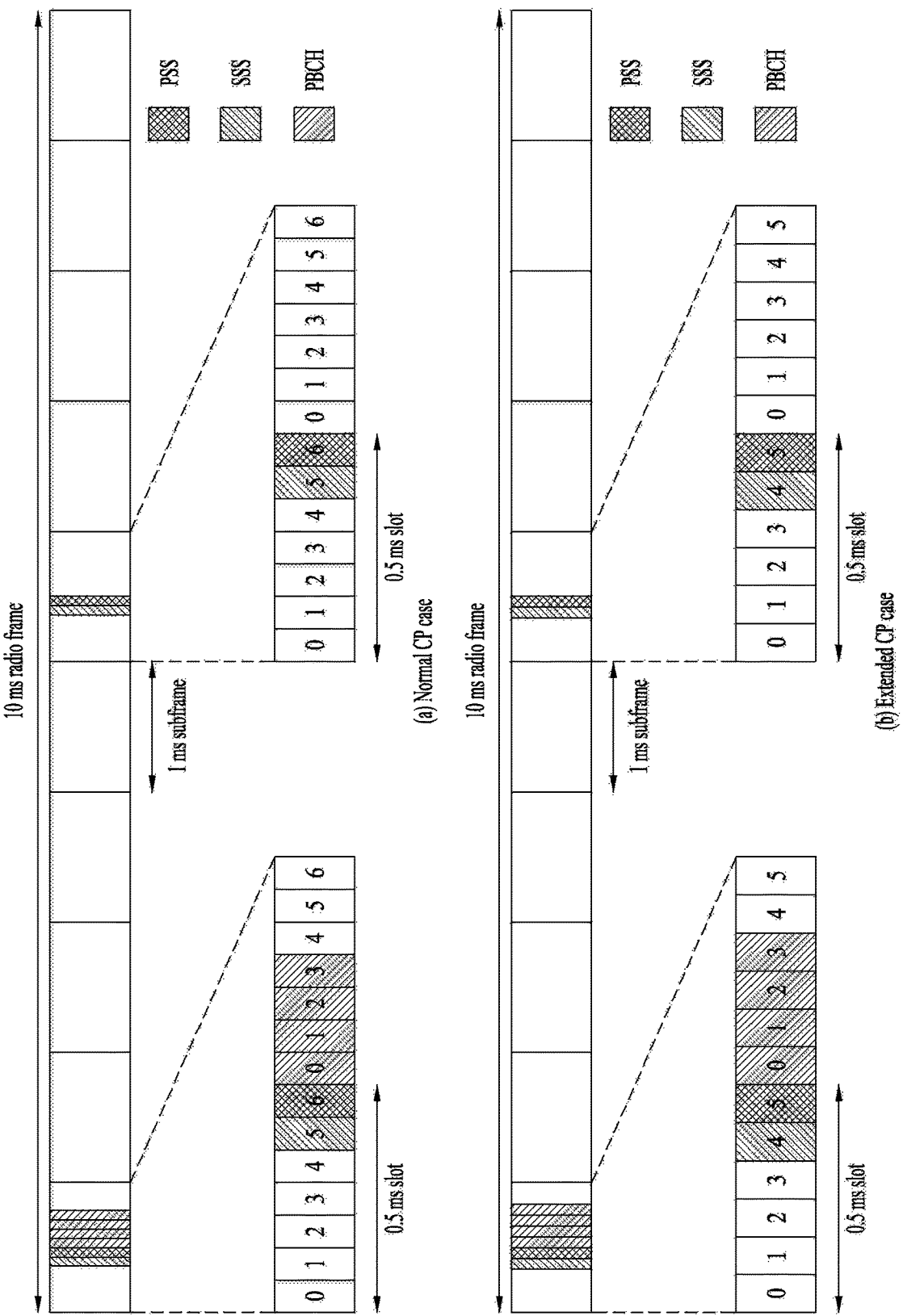
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

An SS will be described in more detail with reference to FIG. 3. An SS is categorized into a primary synchronization signal (PSS) and an secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 3, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

By detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present disclosure.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present disclosure. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 4:
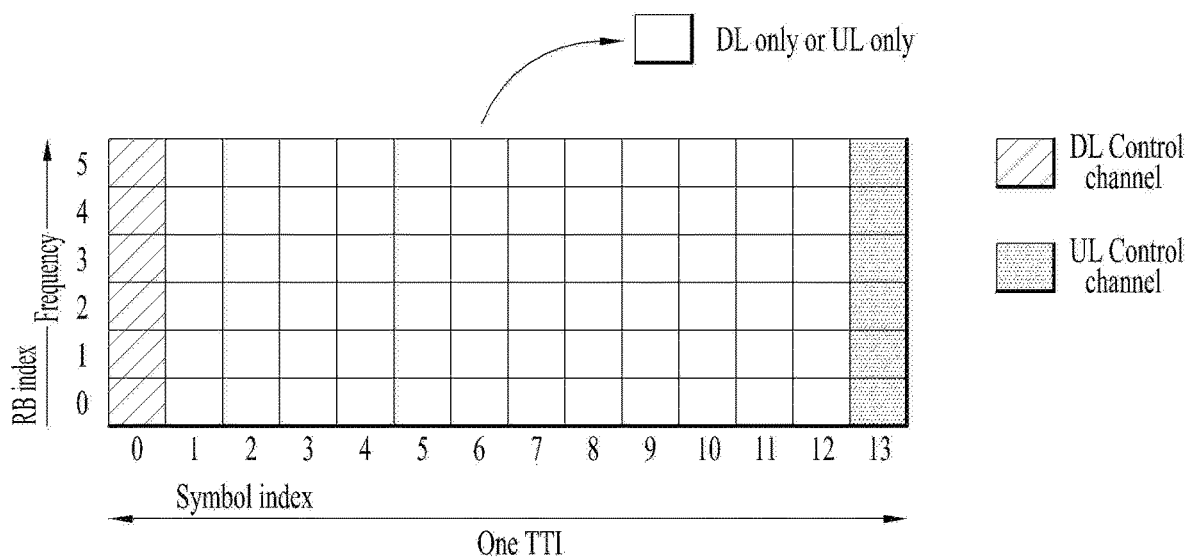
FIG. 4 is a view illustrating an exemplary slot structure available in new radio access technology (NR).

FIG. 4 illustrates an exemplary slot structure available in the new radio access technology (NR).

To minimize a data transmission delay, a slot structure in which a control channel and a data channel are multiplexed in time division multiplexing (TDM) is considered in $5^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency.

Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, Ts is defined as 1/(15000*2048) seconds, in consideration of the basic 15-kHz subcarrier spacing and a maximum FFT size of 2048. Ts is also a sampling time for the 15-kHz subcarrier spacing. In the NR system, many other subcarrier spacings than 15 kHz are available, and since a subcarrier spacing is inversely proportional to a corresponding time length, an actual sampling time Ts corresponding to subcarrier spacings larger than 15 kHz becomes shorter than 1/(15000*2048) seconds. For example, the actual sampling time for the subcarrier spacings of 30 kHz, 60 kHz, and 120 kHz may be 1/(2*15000*2048) seconds, 1/(4*15000*2048) seconds, and 1/(8*15000*2048) seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
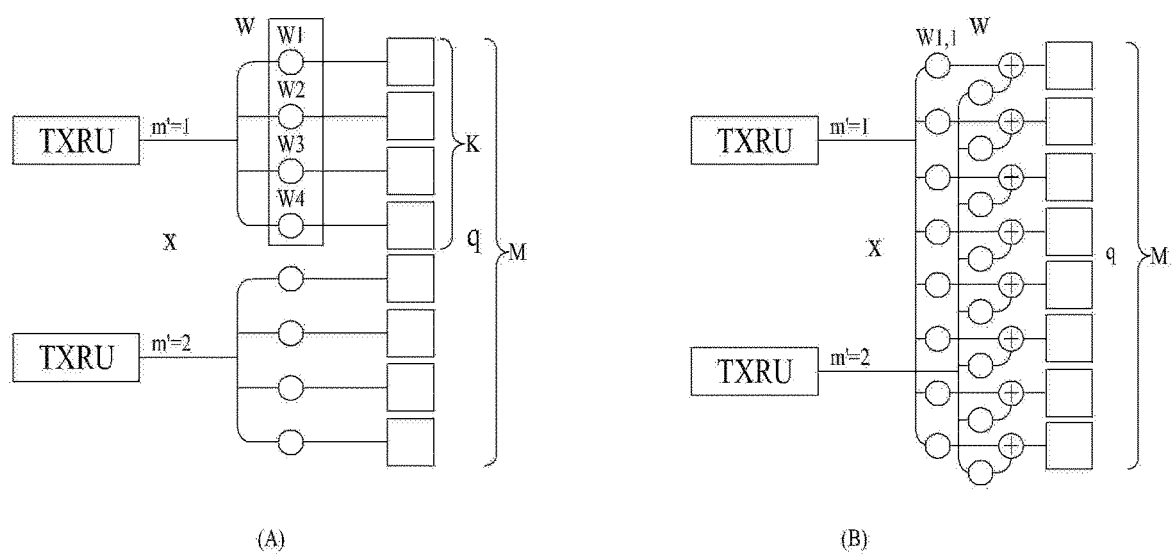
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

<Hybrid Analog Beamforming>

Figure 6:
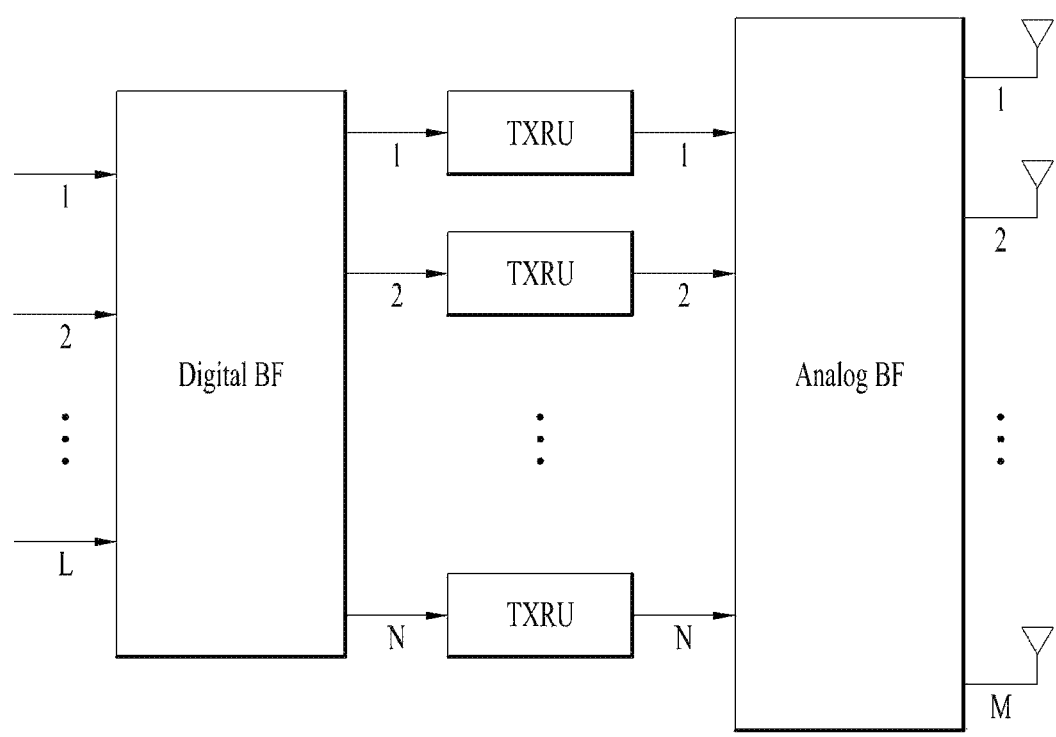
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
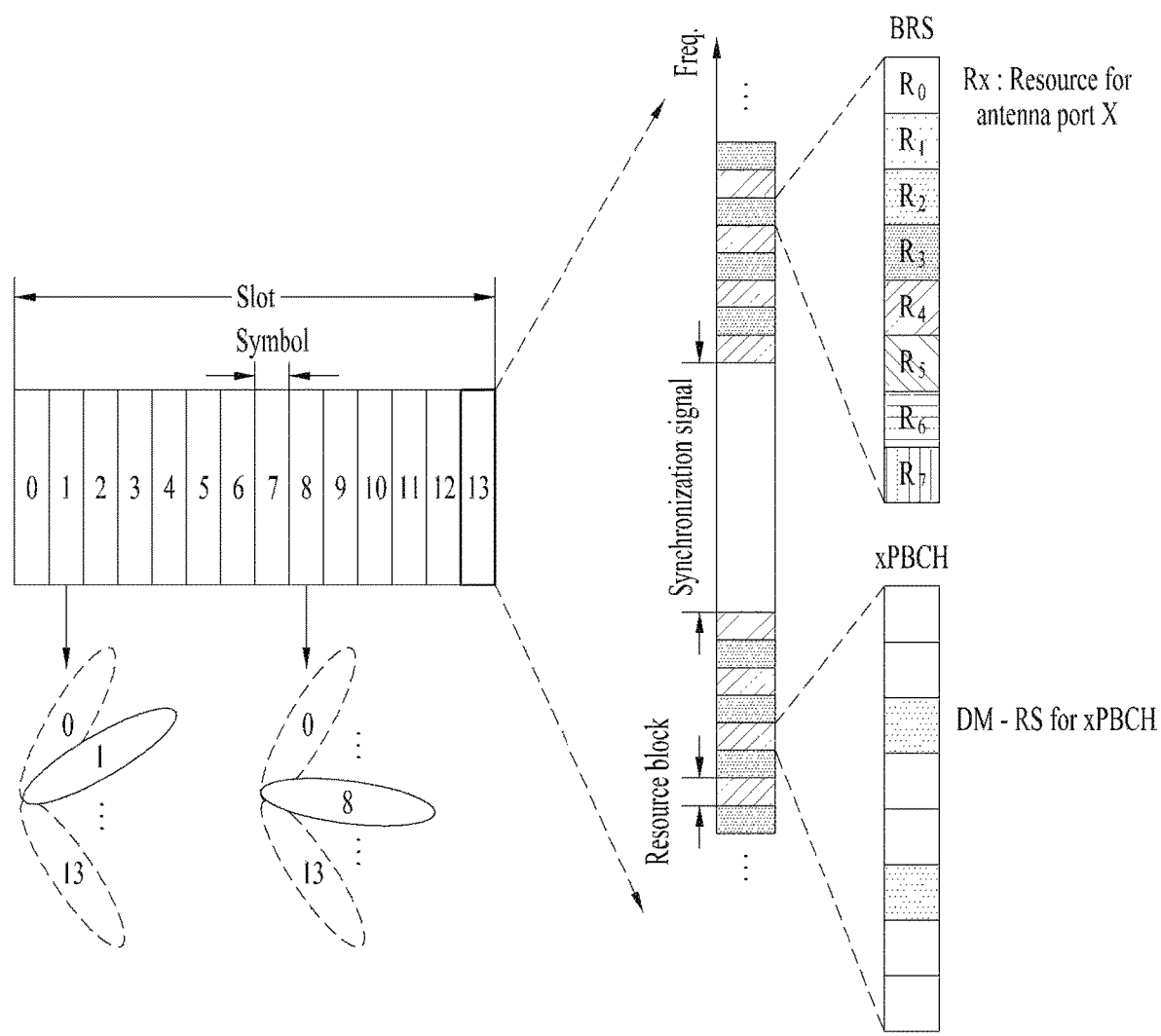
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
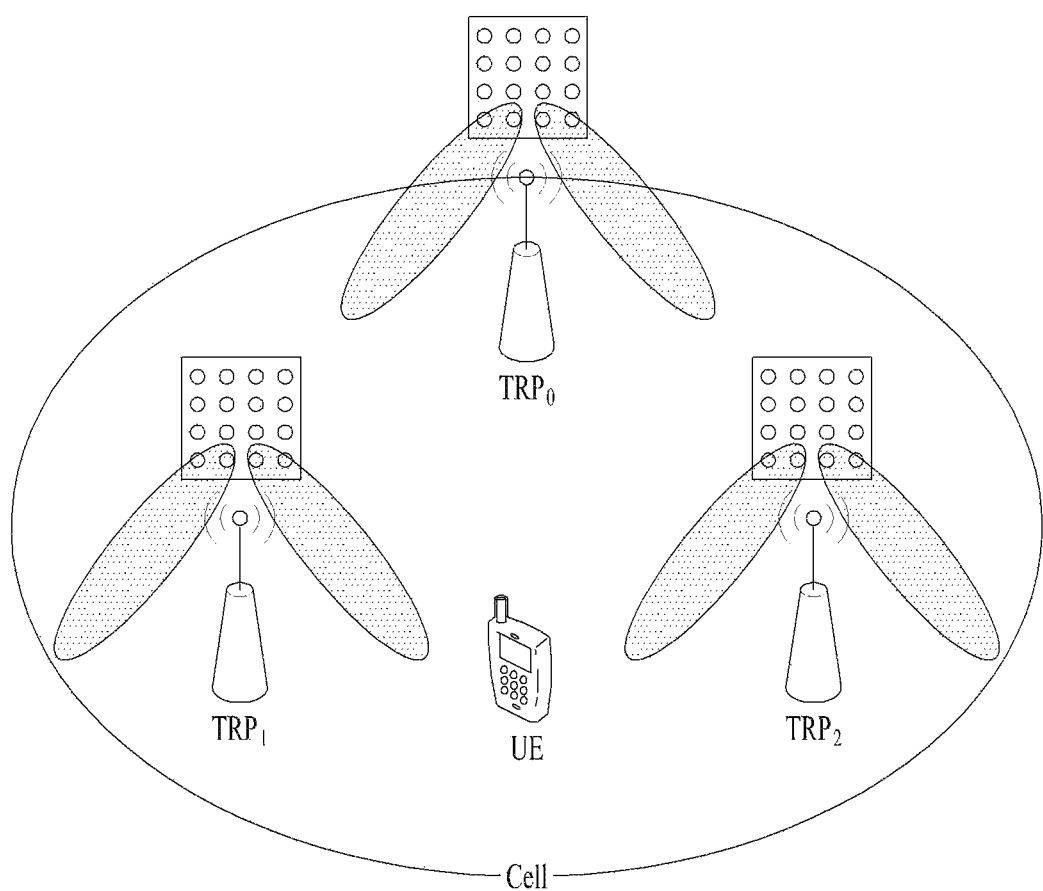
FIG. 8 is a view illustrating an exemplary cell in an NR system.
Figure 14:
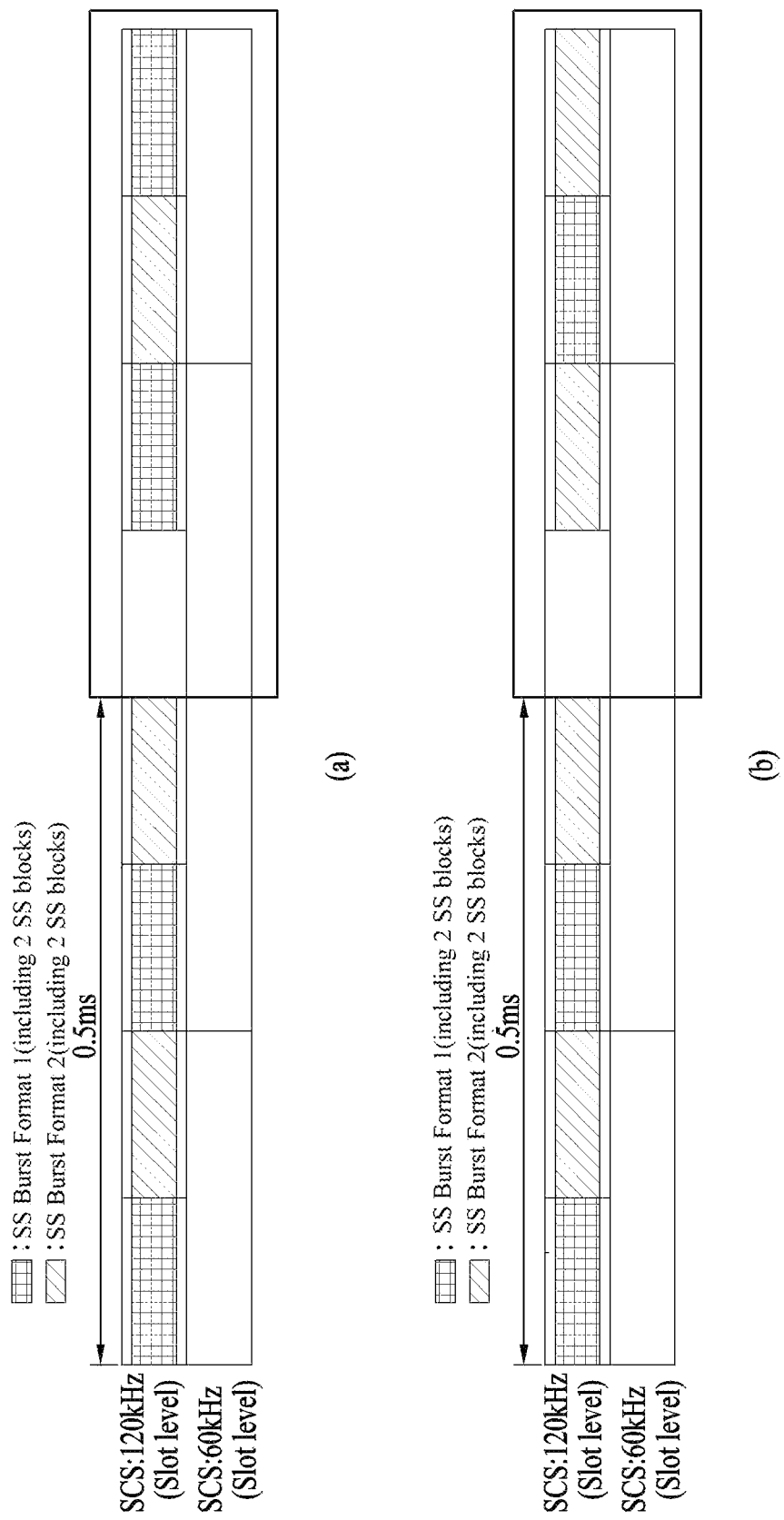

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Prior to description of the present disclosure, positions at which SSBs are disposed, which are described in the present disclosure, mean positions of resource regions in which SSBs can be transmitted and thus may be referred to as candidate SSBs as resource regions in which SSBs can be transmitted.

That is, although positions of candidate SSBs or resource regions in which SSBs can be transmitted are defined in the present disclosure, SSBs are not necessarily transmitted in defined positions of candidate SSBs. In other words, although SSBs can be transmitted at defined positions of candidate SSBs, there may be candidate SSB positions at which SSBs are not transmitted in some cases. Accordingly, in addition to definition of candidate SSB positions, the present disclosure additionally describes a method of indicating information about an actually transmitted synchronization signal block (ATSS).

In addition, an SS burst proposed in the present disclosure is a bundle of candidate SSB positions and represents a set or arrangement of candidate SSBs in a specific time duration or a specific time unit. The SS burst may have different specific time durations or specific time units according to subcarrier spacing. For example, when the number of OFDM symbols included in one symbol is 14, an SS burst having a subcarrier spacing of 15 kHz or 30 kHz used in bands of 6 GHz or lower may refer to a set or arrangement of candidate SSBs included in one slot and an SS burst having a subcarrier spacing of 120 kHz or 240 kHz used in bands of 6 GHz or higher may refer to a set or arrangement of candidate SSBs included within 0.25 ms.

Furthermore, an SS burst set is a group of SS bursts and may refer to a set or arrangement of SS bursts in a unit time of 5 ms.

<Configuration of SS Burst Set>

Hereinafter, the present disclosure describes a method of configuring a SS burst set according to subcarrier spacing (SCS) of a synchronization signal block (SSB) in a system supporting new RAT (NR).

In NR, all SSBs are positioned within a 5 ms window irrespective of periodicity of an SS burst set. In addition, the number of SSBs that need to be positioned within 5 ms is defined differently depending on frequency range.

For example, a maximum of 4 SSBs is disposed within the 5 ms window in bands of 3 GHz or lower and a maximum of 8 SSBs is disposed within the 5 ms window in bands of 3 GHz to 6 GHz. In addition, a maximum of 64 SSBs may be disposed within the 5 ms window in bands of 6 GHz or higher. Further, as a subcarrier spacing for SSBs, 15 kHz or 30 kHz may be used in bands of 6 GHz or lower and 120 kHz or 240 kHz may be used in bands of 6 GHz or higher. However, it is assumed that only the subcarrier spacing of 15 kHz is used in bands of 3 GHz or lower in the present disclosure.

To satisfy the above-described conditions, an SS burst set needs to be configured such that a maximum of 4 or 8 SSBs is disposed within 5 ms at a subcarrier spacing of 15 kHz and needs to be configured such that a maximum of 8 SSBs is disposed within 5 ms at a subcarrier spacing of 30 kHz. Further, an SS burst set needs to be configured such that a maximum of 64 SSBs is disposed at subcarrier spacings of 120 kHz and 240 kHz.

As shown in Table 1, there are various minimum times necessary to dispose a maximum number of SSBs from 2 ms to 4 ms for each subcarrier spacing. Accordingly, it is necessary to configure various SS burst sets within the 5 ms window.

Therefore, the present disclosure describes how to dispose SSBs within the 5 ms window according to subcarrier spacings.

TABLE 1

| Subcarrier Spacing | The maximum number of SS block | | | | | |
|---|---|---|---|---|---|---|
| | 1 | 2 | 4 | 8 | 32 | 64 |
| 15 kHz | 1 ms | 1 ms | 2 ms | 4 ms | — | — |
| 30 kHz | — | 0.5 ms | 1 ms | 2 ms | — | — |
| 120 kHz | — | — | — | — | 2 ms | 4 ms |
| 240 kHz | — | — | — | — | 1 ms | 2 ms |

1. SS Burst Set Configuration in Bands of 3 GHz or Lower

It is assumed that only the 15 kHz subcarrier spacing is used as a subcarrier spacing for SSBs in bands of 3 GHz or lower in the present disclosure. A maximum of 4 SSBs may be included within a 5 ms window in bands of 3 GHz or lower. A maximum of 2 SSBs can be disposed within 1 ms in the case of the 15 kHz subcarrier spacing and thus a minimum of 2 ms is required to include a maximum of 4 SSBs. In addition, an SS burst set may be configured in bands of 3 GHz or lower on the basis of the above description, as shown in FIG. 9.

Embodiment 1-1

As shown in FIG. 9(a), an SS burst set configured such that 4 SSBs are disposed within 2 ms may be considered. When the SS burst set is configured as shown in FIG. 9(a), a UE in an idle state can use only 2 ms for SSB decoding and thus it is advantageous from the viewpoint of power consumption. If 4 or less SSBs are used within a 5 ms window, actually transmitted SSBs may be signaled to a UE using a bitmap. However, the UE may assume that SSBs are transmitted being disposed from the front part of candidate SSB transmission positions for SSB transmission if there is no bitmap information.

Embodiment 1-2

In embodiment 1-2, 2 SSBs are defined as a single SS burst unit and SS burst units are disposed at a predetermined interval of 1 ms or more, as shown in FIG. 9(b). That is, since 2 SSBs constitute a single SS burst, a single SS burst becomes a single SS burst unit in embodiment 1-2. When an SS burst set is configured in this manner, durations in which SSBs are not disposed may be used for uplink transmission and thus low latency communication using the same can be performed. If 4 or less SSBs are used within the 5 ms window, actually transmitted SSBs may be signaled to a UE using a bitmap. However, the UE may assume that SSBs are transmitted being disposed from the front part of candidate SSB transmission positions for SSB transmission or SS burst units are alternately disposed if there is no bitmap information. For example, when 2 SSBs are disposed, one SSB may be disposed in the first SS burst unit and the remaining SSB may be disposed in the second SS burst unit.

2. SS Burst Set Configuration in Bands of 3 GHz to 6 GHz 15 kHz and 30 kHz are used as subcarrier spacings for SSBs in bands of 3 GHz to 6 GHz. A maximum 8 SSBs may be disposed within a 5 ms window in the corresponding bands. Specifically, a maximum of 2 SSBs may be disposed in 1 ms at the subcarrier spacing of 15 kHz and a maximum of 2 SSBs may be disposed in 0.5 ms at the subcarrier spacing of 30 kHz. Accordingly, a minimum of 4 ms is necessary to dispose 8 SSBs at the 15 kHz subcarrier spacing and a minimum of 2 ms is necessary to dispose 8 SSBs at the 30 kHz subcarrier spacing. Based on this, embodiments for SS burst set configuration in bands of 3 GHz to 6 GHz are described with reference to FIGS. 10 and 11.

(1) When Subcarrier Spacing of SSB is 15 kHz

Embodiment 2-1

As shown in FIG. 10(a), an SS burst set may be configured such that all of 4 SSBs are disposed in 4 ms. When an SS burst set is configured as shown in FIG. 10(a), a UE in an idle state can use only 4 ms for SSB decoding and thus it is advantageous from the viewpoint of power consumption. If 8 or less SSBs are used in a 5 ms window, actually transmitted SSBs may be signaled to a UE using a bitmap. However, the UE may assume that SSBs are transmitted being disposed from the front part of candidate SSB transmission positions for SSB transmission if there is no bitmap information.

Embodiment 2-2

In embodiment 2-2, 4 SSBs are defined as a single SS burst unit and SS burst units are disposed at a predetermined interval of 1 ms or more, as shown in FIG. 10(b). That is, since 2 SSBs constitute a single SS burst, 2 SS bursts are defined as a single SS burst unit in embodiment 2-2. When an SS burst set is configured in this manner, durations in which SSBs are not disposed may be used for uplink transmission and thus low latency communication using the same can be performed.

If 8 or less SSBs are used within a 5 ms window, actually transmitted SSBs may be signaled to a UE using a bitmap. However, the UE may assume that SSBs are transmitted being disposed from the front part of candidate SSB transmission positions for SSB transmission or SS burst units are alternately disposed if there is no bitmap information. For example, when 3 SSBs are disposed, one SSB may be disposed in the first SS burst unit, another SSB may be disposed in the second SS burst unit and the remaining SSB may be disposed in the first SS burst unit.

(2) When Subcarrier Spacing of SSB is 30 kHz

Embodiment 2-3

As shown in FIG. 11(a), an SS burst set may be configured such that all of 8 SSBs are disposed in 2 ms. When an SS burst set is configured as shown in FIG. 11(a), a UE in an idle state can use only 2 ms for SSB decoding and thus it is advantageous from the viewpoint of power consumption. If 8 or less SSBs are used in a 5 ms window, actually transmitted SSBs may be signaled to a UE using a bitmap. However, the UE may assume that SSBs are transmitted being disposed from the front part of candidate SSB transmission positions for SSB transmission if there is no bitmap information.

Embodiment 2-4

In embodiment 2-4, N SSBs are defined as a single SS burst unit and SS burst units are disposed at a predetermined interval of 0.5 ms or more, as shown in FIG. 11(b). When an SS burst set is configured in this manner, durations in which SSBs are not disposed may be used for uplink transmission and thus low latency communication using the same can be performed.

If 8 or less SSBs are used within a 5 ms window, actually transmitted SSBs may be signaled to a UE using a bitmap. However, the UE may assume that SSBs are transmitted being disposed from the front part of candidate SSB transmission positions for SSB transmission or SS burst units are alternately disposed if there is no bitmap information. For example, when 3 SSBs are disposed, one SSB may be disposed in the first SS burst unit, another SSB may be disposed in the second SS burst unit and the remaining SSB may be disposed in the third SS burst unit.

3. SS Burst Set Configuration in Bands of 6 GHz or Higher 120 kHz and 240 kHz are used as subcarrier spacings for SSBs in bands of 6 GHz or higher. A maximum 64 SSBs may be disposed within a 5 ms window in the corresponding bands. A maximum of 2 SSBs may be disposed in 0.125 ms at the subcarrier spacing of 120 kHz and a maximum of 4 SSBs may be disposed in 0.125 ms at the subcarrier spacing of 240 kHz. Accordingly, a minimum of 4 ms is necessary to dispose 64 SSBs at the 120 kHz subcarrier spacing and a minimum of 2 ms is necessary to dispose 64 SSBs at the 240 kHz subcarrier spacing. Based on this, embodiments for SS burst set configuration in bands of 6 GHz or higher are described with reference to FIGS. 12 to 15. Additionally, in embodiments 3-1 to 3-3, it is assumed that a single SSB burst unit is configured in units of 8 SSBs in consideration of smooth operation of URLLC (Ultra Reliable Low Latency Communications) and overhead of a bitmap indicating information about ATSSs to UEs.

Embodiment 3-1

As shown in FIG. 12, an SS burst set may be configured such that all of 64 SSBs are consecutive. Here, FIG. 12(a) shows an SS burst set configuration in the case of a subcarrier spacing of 120 kHz and FIG. 12(b) shows an SS burst set configuration in the case of a subcarrier spacing of 240 kHz.

When an SS burst set is configured as shown in FIG. 12, a UE in an idle state can use only 4 ms for SSB decoding in the case of 120 kHz and use 2 ms for SSB decoding in the case of 240 kHz and thus it is advantageous from the viewpoint of power consumption. If 64 or less SSBs are used in a 5 ms window, actually transmitted SS burst units may be signaled to a UE using a bitmap. In addition, the UE may know information about the number of SSBs used per SS burst unit by performing blind detection or using other methods. However, the UE may assume that SSBs are transmitted being disposed from the front part of candidate SSB transmission positions for SSB transmission if there is no bitmap information.

Embodiment 3-2

In embodiment 3-2, N SSBs are defined as a single SS burst unit and SS burst units are disposed at a predetermined interval of 0.125 ms or more, as shown in FIG. 13. FIG. 13(a) shows an SS burst set configuration in the case of a subcarrier spacing of 120 kHz and FIG. 13(b) shows an SS burst set configuration in the case of a subcarrier spacing of 240 kHz.

When an SS burst set is configured in this manner, durations in which SSBs are not disposed may be used for uplink transmission and thus low latency communication using the same can be performed.

If 64 or less SSBs are used within a 5 ms window, actually transmitted SS burst units may be signaled to a UE using a bitmap. In addition, the UE may know information about the number of SSBs used per SS burst unit by performing blind detection or using other methods.

However, the UE may assume that SSBs are transmitted being disposed from the front part of candidate SSB transmission positions for SSB transmission or SS burst units are alternately disposed if there is no bitmap information. For example, when 3 SSBs are disposed, one SSB may be disposed in the first SS burst unit, another SSB may be disposed in the second SS burst unit and the remaining SSB may be disposed in the third SS burst unit.

Embodiment 3-3

In NR, SSBs and data may be multiplexed and transmitted even when a subcarrier spacing of the SSBs differs from a subcarrier spacing of the data. That is, one of 60 kHz and 120 kHz may be selected as the subcarrier spacing of data, one of 120 kHz and 240 kHz may be selected as the subcarrier spacing of SSBs and the data and the SSBs may be multiplexed.

If the subcarrier spacing of data is 60 kHz and the subcarrier spacing of SSBs is 120 kHz, when an SS burst set is configured as in embodiment 3-2, SSBs are disposed from the middle of a slot having a 60 kHz subcarrier spacing, as shown in FIG. 14(a).

However, when the SS burst set is configured as shown in FIG. 14(a), control regions of the front part and the rear part of the slot having the 60 kHz subcarrier spacing may not be guaranteed because symbols for downlink control and symbols for uplink control need to be allocated to the front part and the rear part of a slot in NR. Accordingly, SS bursts may be reconfigured as shown in FIG. 14(b) only in cases in which SS bursts are configured such that control regions for data cannot be guaranteed.

Figure 15:
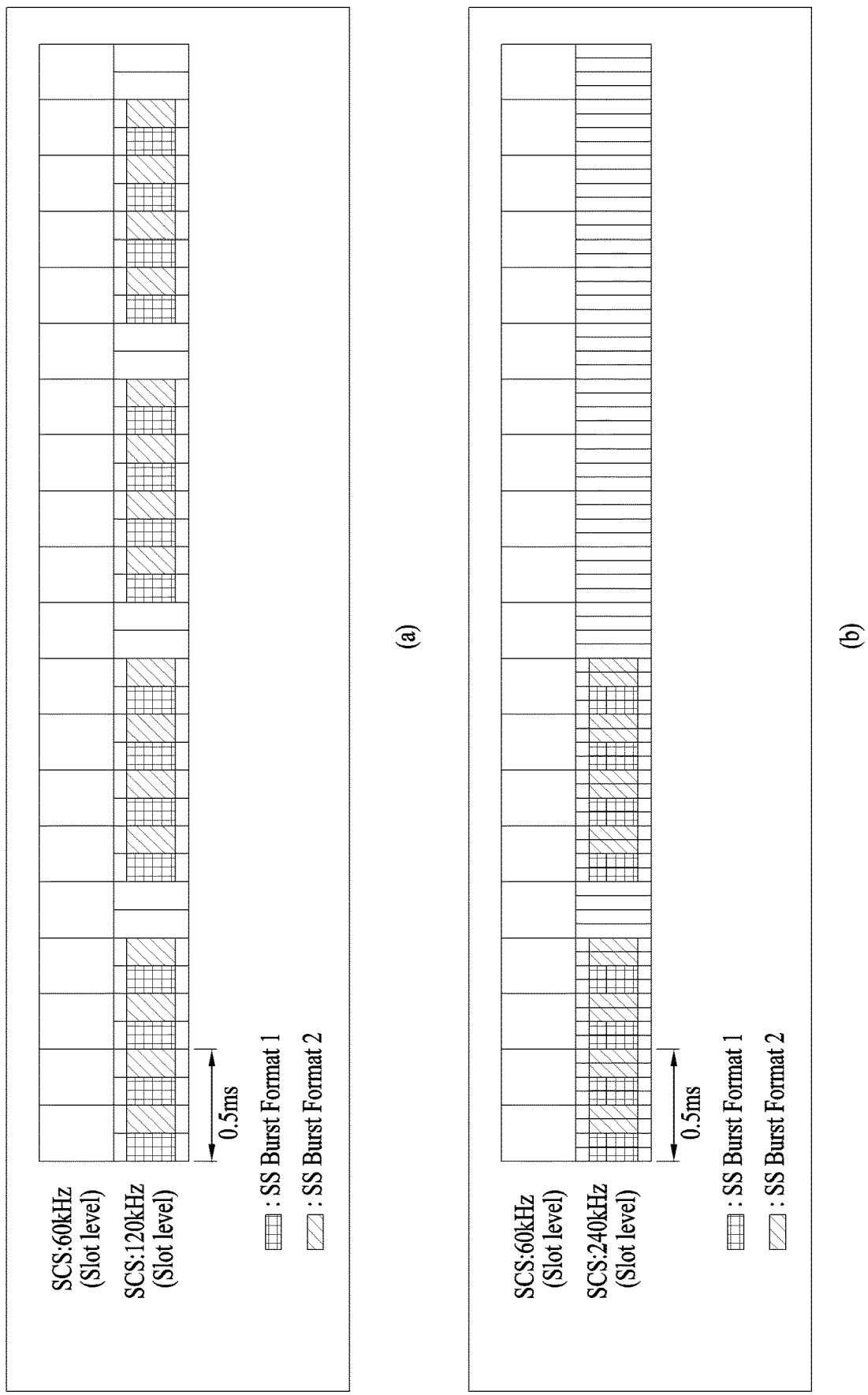
FIGS. 15 to 29 show examples of configuring candidate SSBs in SS bursts.

Alternatively, an SS burst set configuration may be designed according to a 60 kHz slot duration. As shown in FIG. 15, it is possible to design an SS burst set configuration such that SSBs are disposed from the front part of a slot having a 60 kHz subcarrier spacing while allocating a predetermined duration in which no SSB is disposed for uplink communication, similarly to embodiment 3-2. Here, FIG. 15(a) shows an embodiment in which an SSB subcarrier spacing is 120 kHz and a data subcarrier spacing is 60 kHz and FIG. 15(b) shows an embodiment in which the SSB subcarrier spacing is 240 kHz and the data subcarrier spacing is 60 kHz.

Further, addition of an offset per cell ID to the SS burst set configurations proposed in embodiments 1-1 to 3-3 may be considered. When an offset is added, interference from SSBs of a neighbor cell can be reduced.

<Configuration of SS Burst>

Now, a method of configuring an SS burst when an SSB subcarrier spacing differs from a data subcarrier spacing in a system supporting NR (New RAT) is described. In NR, time/frequency resource grids are configured using a data numerology as a reference numerology. An SSB may be identical to the reference numerology or different therefrom and resource grids configured on the basis of the data numerology may be multiplexed.

In addition, in the system supporting NR, each slot may include symbols for downlink control, a guard period for downlink/uplink switching and symbols for uplink control. Here, if a situation in which an SSB and data which have different subcarrier spacings are multiplexed occurs, the SSB may be mapped overlapping with symbols for downlink control due to a symbol duration difference. In this case, it is possible to avoid collision between the SSB and symbols for data control according to configuration of an SS burst which is a bundle of SSBs.

Figure 16:
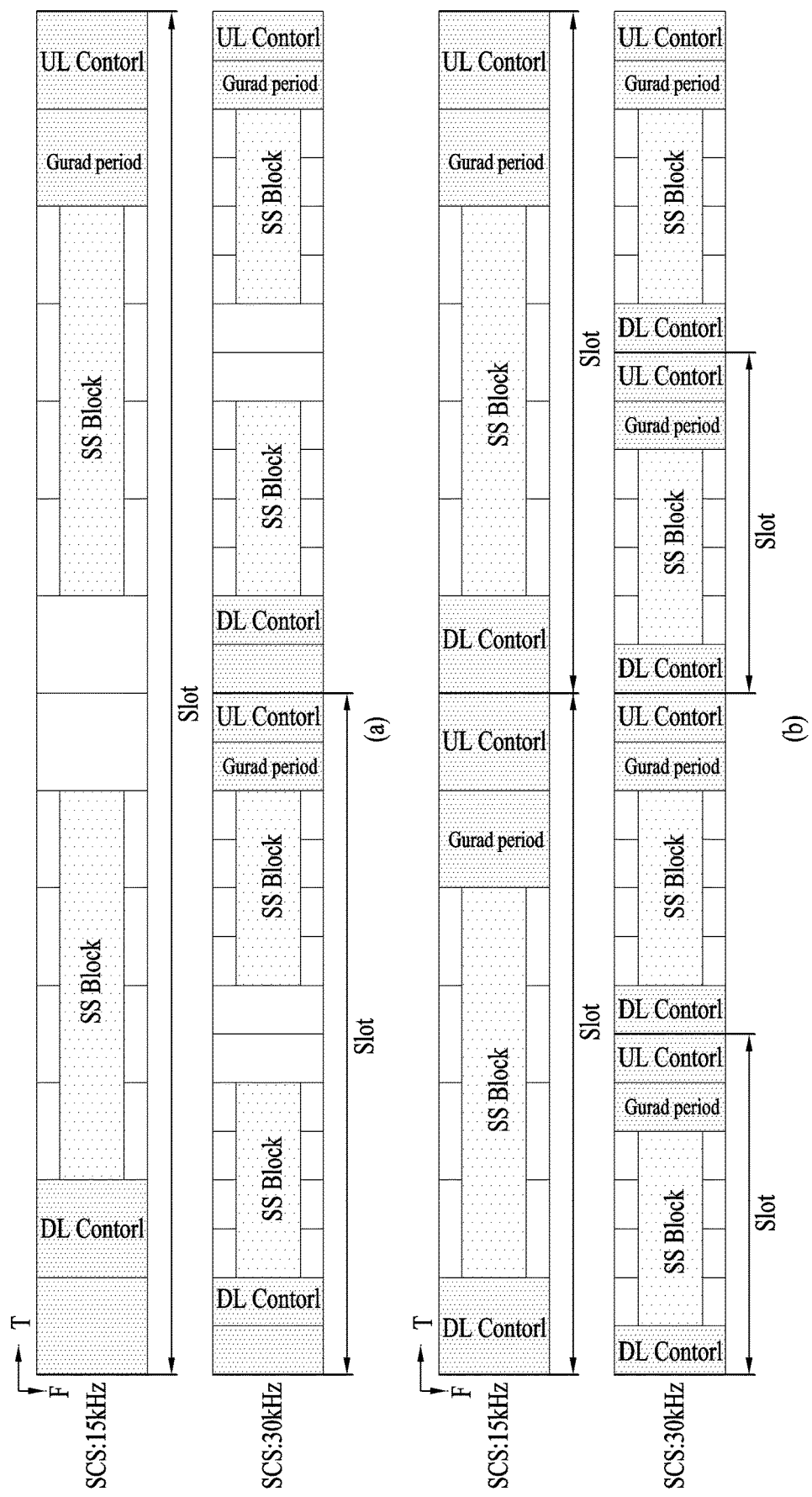

Meanwhile, a slot may be composed of 14 OFDM symbols or 7 OFDM symbols in the current NR. As shown in FIGS. 16(*a*) and (*b*), an SS burst configuration may vary according to the number of symbols of a slot. Accordingly, a gNB needs to allocate 1 bit to PBCH content to transmit information indicating whether the number of symbols of the current slot is 7 or 14 to a UE and signal information on the number of symbols per slot of a neighbor cell to the UE through the PBCH content.

Further, an SSB discussed in NR is composed of a total of 4 symbols including a PSS, an SSS and a PBCH, and 2 SSBs may be included in a slot composed of 14 OFDM symbols and 1 SSB may be included in a slot composed of 7 OFDM symbols.

In addition, the SSB may have a subcarrier spacing of 15 kHz or 30 kHz in bands of 6 GHz or lower and 120 kHz or 240 kHz in bands of 6 GHz or higher. On the contrary, a subcarrier spacing for data may be any one of 15 kHz, 30 kHz, 60 kHz and 120 kHz. Further, referring to the currently discussed NR slot structure, one slot includes 1 or 2 symbols for downlink control, a guard period and 2 symbols for uplink control when the slot is composed of 14 OFDM symbols. If one slot is composed of 7 OFDM symbols, the slot includes one symbol for downlink control, a guard period and 2 symbols for uplink control.

Based on the above description, the present disclosure describes a method of disposing SSBs in a slot when an SSB and data having different subcarrier spacings are multiplexed.

4. SS Burst Configuration in Bands of 6 GHz or Lower

Figure 17:
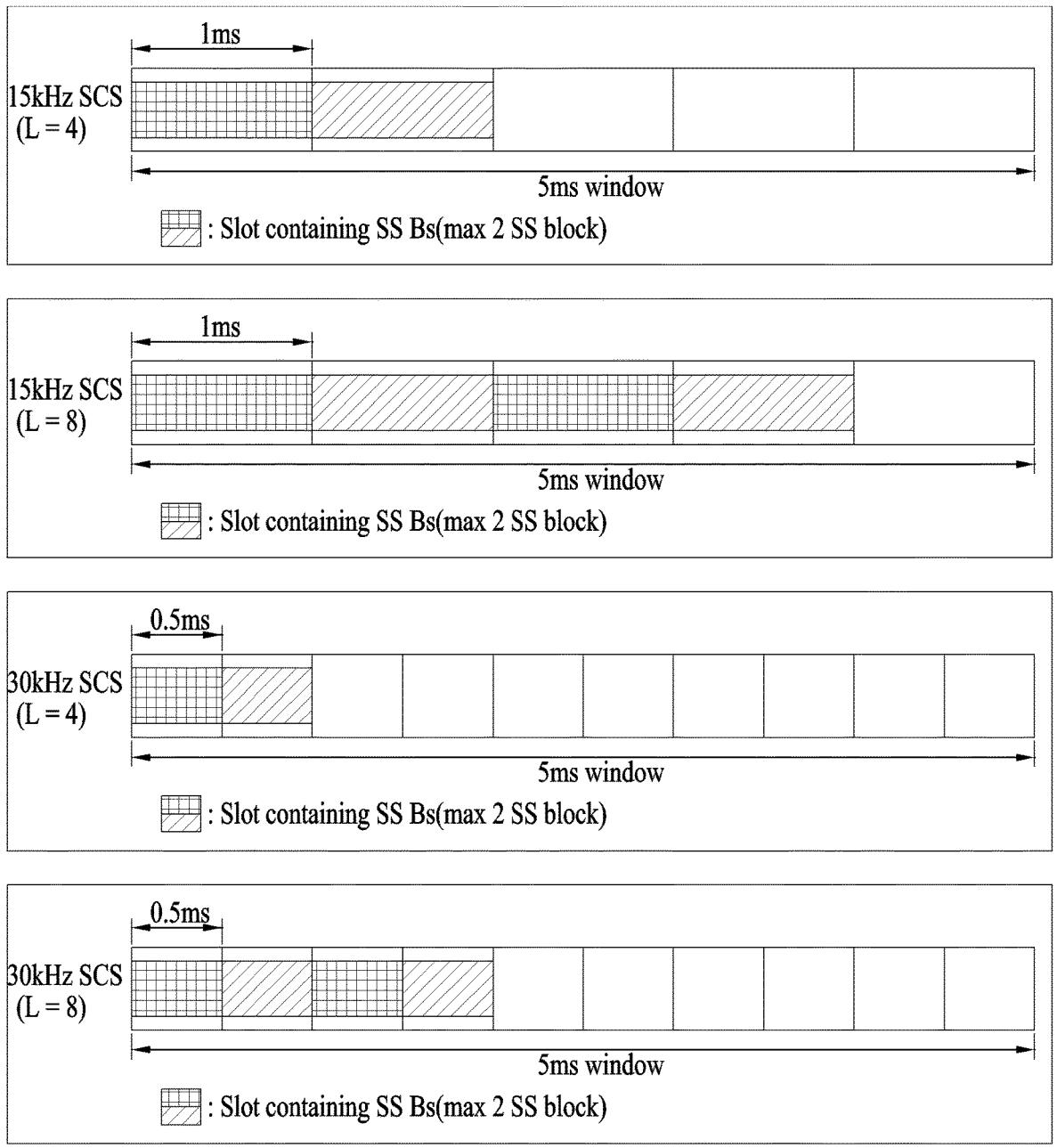

Hereinafter, methods of disposing SSBs when an SSB and data are multiplexed are described. A data subcarrier spacing may be 15 kHz, 30 kHz or 60 kHz and an SSB subcarrier spacing may be 15 kHz or 30 kHz in bands of 6 GHz or lower. In addition, one symbol for a guard period for downlink/uplink switching, one symbol for uplink control and one or two symbols for downlink control are required in a slot. Methods of disposing SSBs in an SS burst on the basis of the above description will be described in embodiments 4-1 to 4-4. It is assumed that an SS burst set including SS bursts described in embodiments 4-1 to 4-4 is configured as shown in FIG. 17.

Embodiment 4-1

Figure 18:
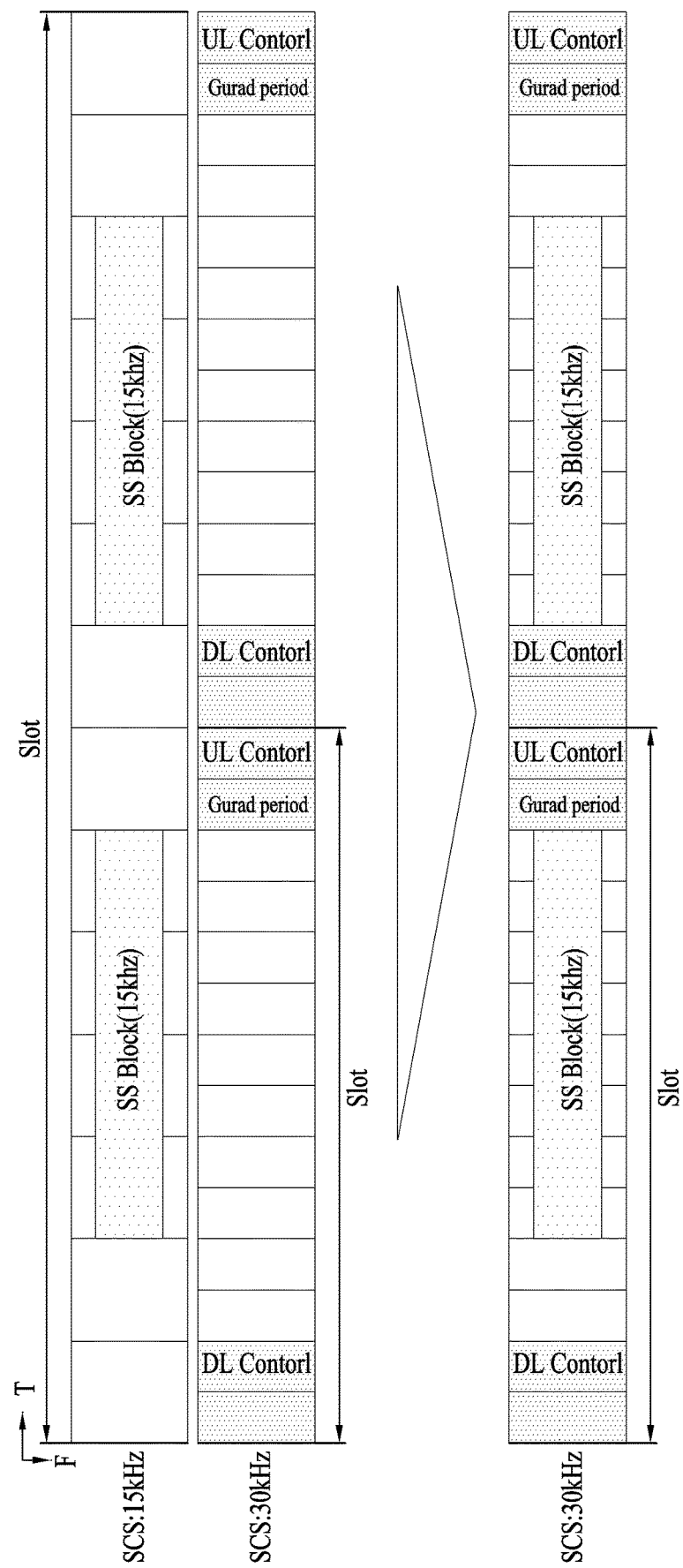

When SSBs having a subcarrier spacing of 15 kHz and data having a subcarrier spacing of 30 kHz are multiplexed in a slot composed of 14 OFDM symbols, the SSBs may be disposed as shown in FIG. 18. In this case, the SSBs having a subcarrier spacing of 15 kHz are disposed not to intrude control regions even when the data subcarrier spacing is 15 kHz or 30 kHz. Here, considering the SS burst configurations and SS burst set configurations shown in FIGS. 17 and 18, a method of disposing SSBs within a 5 ms window may be arranged as follows.

15 kHz Subcarrier Spacing

The first OFDM symbols of candidate SSBs have indexes of $\{2, 8\}+14*n$. Here, $n=0, 1$ for carrier frequencies lower than or equal to 3 GHz and $n=0, 1, 2, 3$ for carrier frequencies higher than 3 GHz and lower than or equal to 6 GH.

Embodiment 4-2

Figure 19:
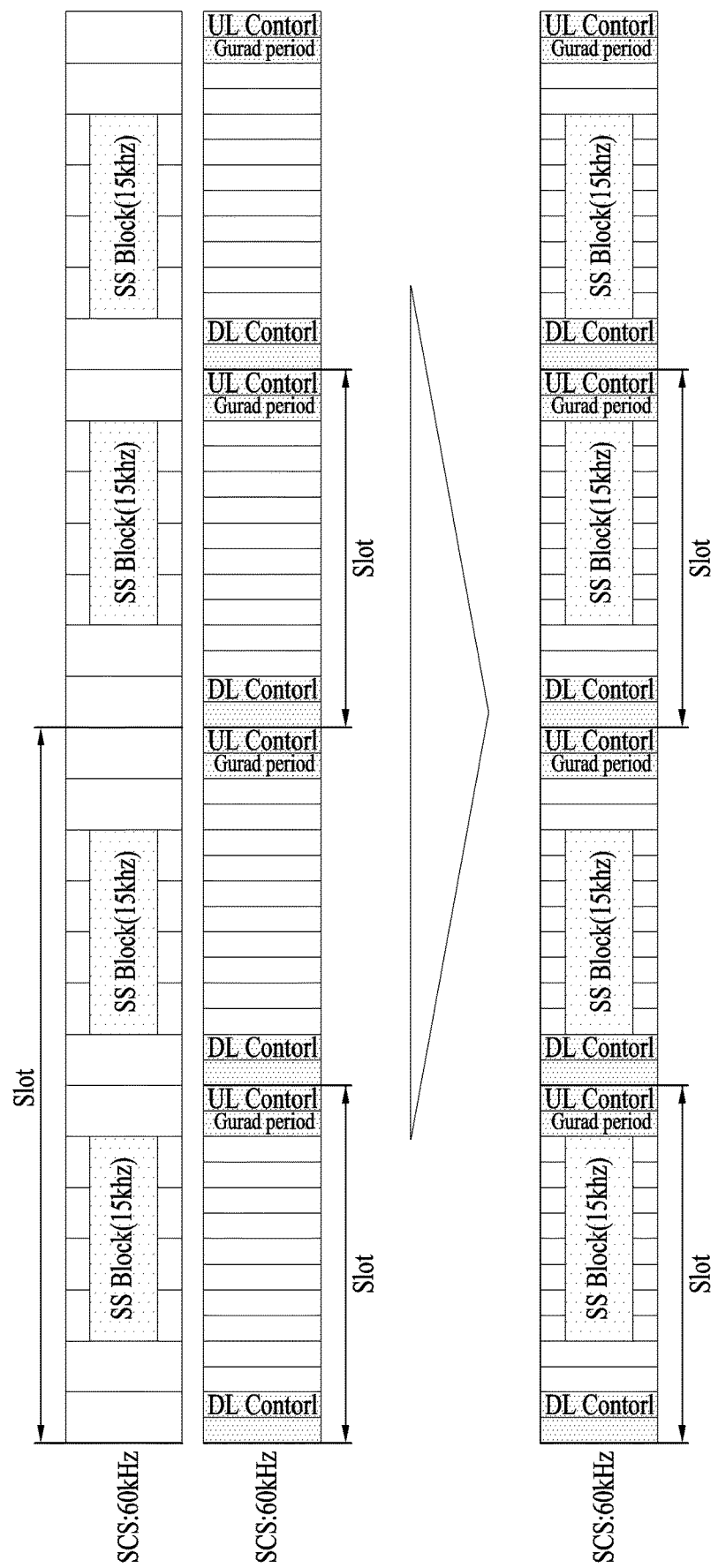

When SSBs having a subcarrier spacing of 30 kHz and data having a subcarrier spacing of 60 kHz are multiplexed in a slot composed of 14 OFDM symbols, the SSBs may be disposed as shown in FIG. 19. In this case, the SSBs having a subcarrier spacing of 30 kHz are disposed not to intrude control regions even when the data subcarrier spacing is 30 kHz or 60 kHz. Here, considering the SS burst configurations and SS burst set configurations shown in FIGS. 17 and 19, a method of disposing SSBs within a 5 ms window may be arranged as follows.

30 kHz Subcarrier Spacing

The first OFDM symbols of candidate SSBs have indexes of $\{2, 8\}+14*n$. Here, $n=0, 1$ for carrier frequencies lower than or equal to 3 GHz and $n=0, 1, 2, 3$ for carrier frequencies higher than 3 GHz and lower than or equal to 6 GH.

Embodiment 4-3

Figure 20:
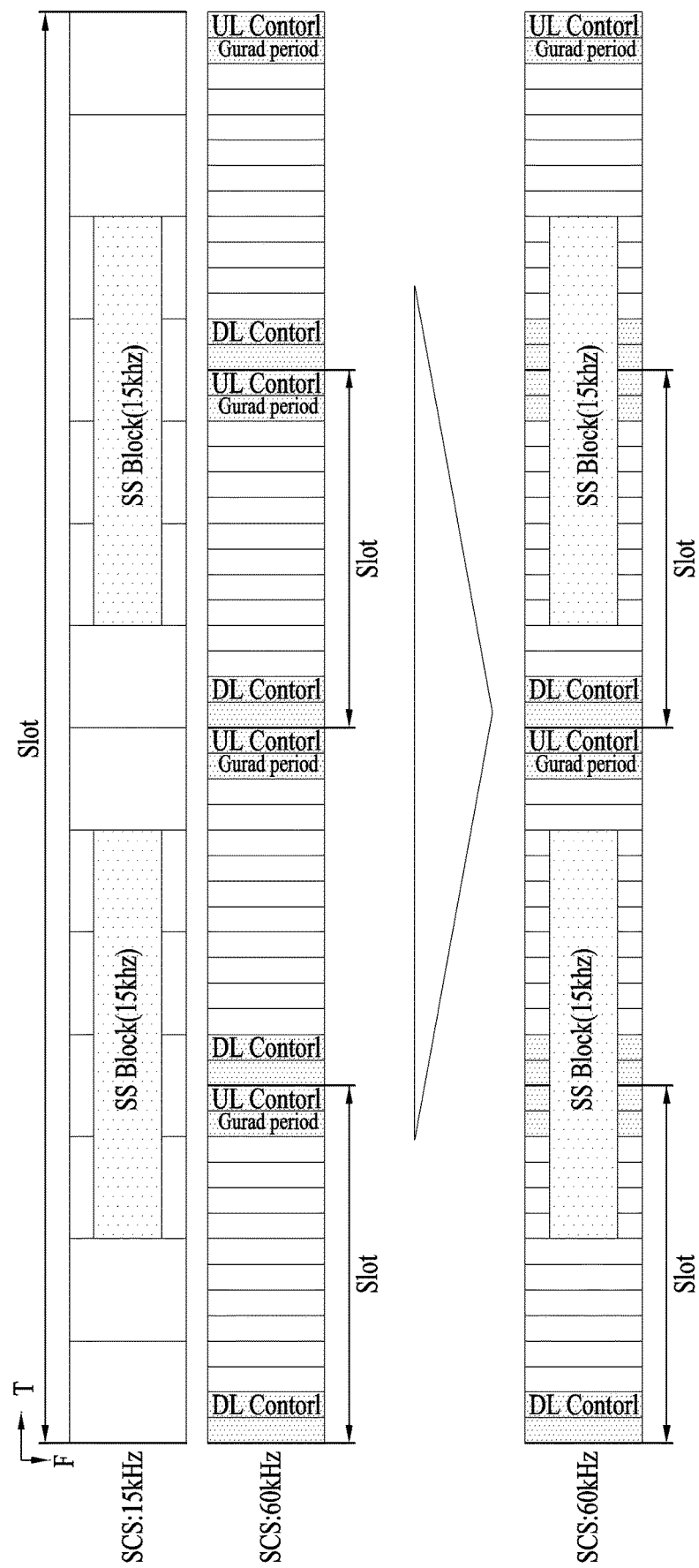

When SSBs having a subcarrier spacing of 15 kHz and data having a subcarrier spacing of 60 kHz are multiplexed in a slot composed of 14 OFDM symbols, the SSBs may be disposed as shown in FIG. 20. In this case, the SSBs having the 15 kHz subcarrier spacing overlap with guard periods and uplink control symbols included in the first and third slots of the data having the 60 kHz subcarrier spacing and downlink control symbols included in the second and fourth slots of the data. Accordingly, the first and third slots may be configured as downlink only slots having no uplink control symbol.

Embodiment 4-4

Figure 21:
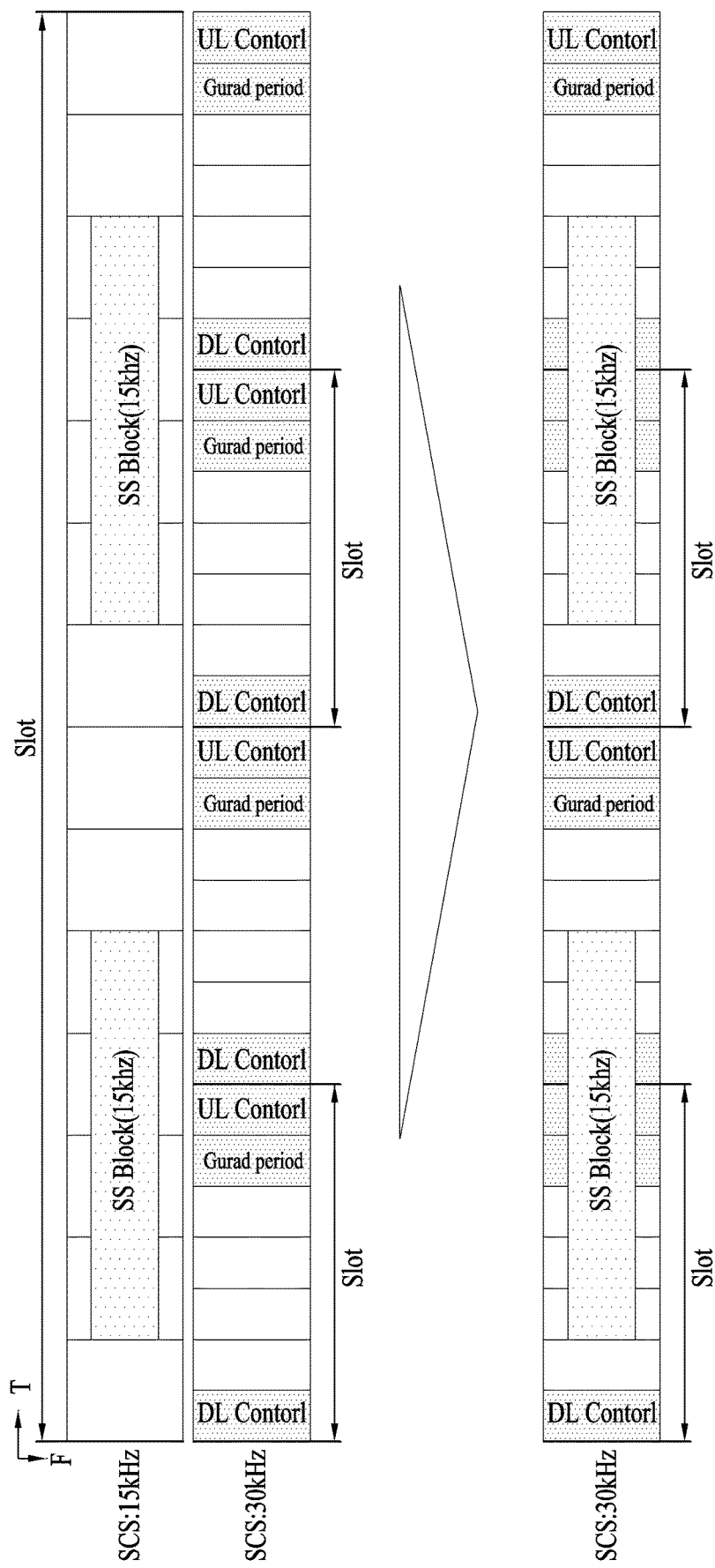

When SSBs having a subcarrier spacing of 15 kHz and data having a subcarrier spacing of 30 kHz are multiplexed in a slot composed of 7 OFDM symbols, the SSBs may be disposed as shown in FIG. 21. In this case, the SSBs having the 15 kHz subcarrier spacing overlap with a guard period and an uplink control symbol included in the first slot of the data having the 30 kHz subcarrier spacing and a downlink control symbol included in the second slot of the data. Accordingly, the first slot may be configured as a downlink only slot having no uplink control symbol.

5. SS Burst Configuration in Bands of 6 GHz or Higher

Figure 22:
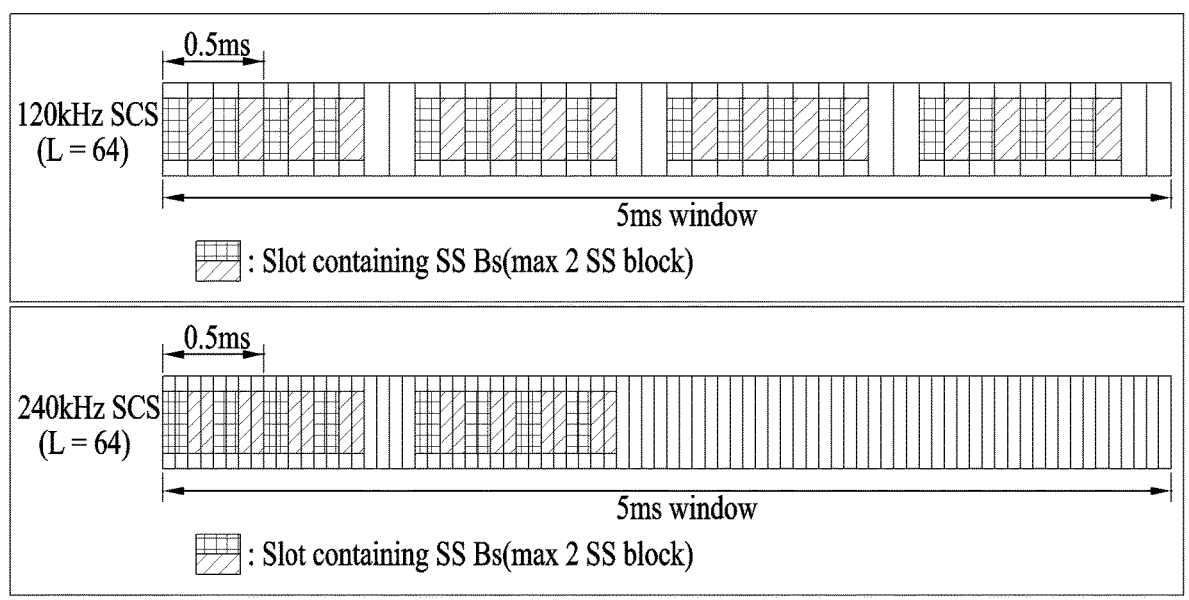

Now, SSB arrangement when SSBs and data are multiplexed in bands of 6 GHz or higher is described based on embodiments 5-1 to 5-3. A data subcarrier spacing may be 60 kHz or 120 kHz and an SSB subcarrier spacing may be 120 kHz or 240 kHz in bands of 6 GHz or higher. In addition, one symbol for a guard period for downlink/uplink switching, one symbol for uplink control and one or two symbols for downlink control are required in a slot. Methods of disposing SSBs in an SS burst on the basis of the above description will be described in embodiments 5-1 to 5-3. It is assumed that an SS burst set including SS bursts described in embodiments 5-1 to 5-3 is configured as shown in FIG. 22.

Embodiment 5-1

Figure 23:
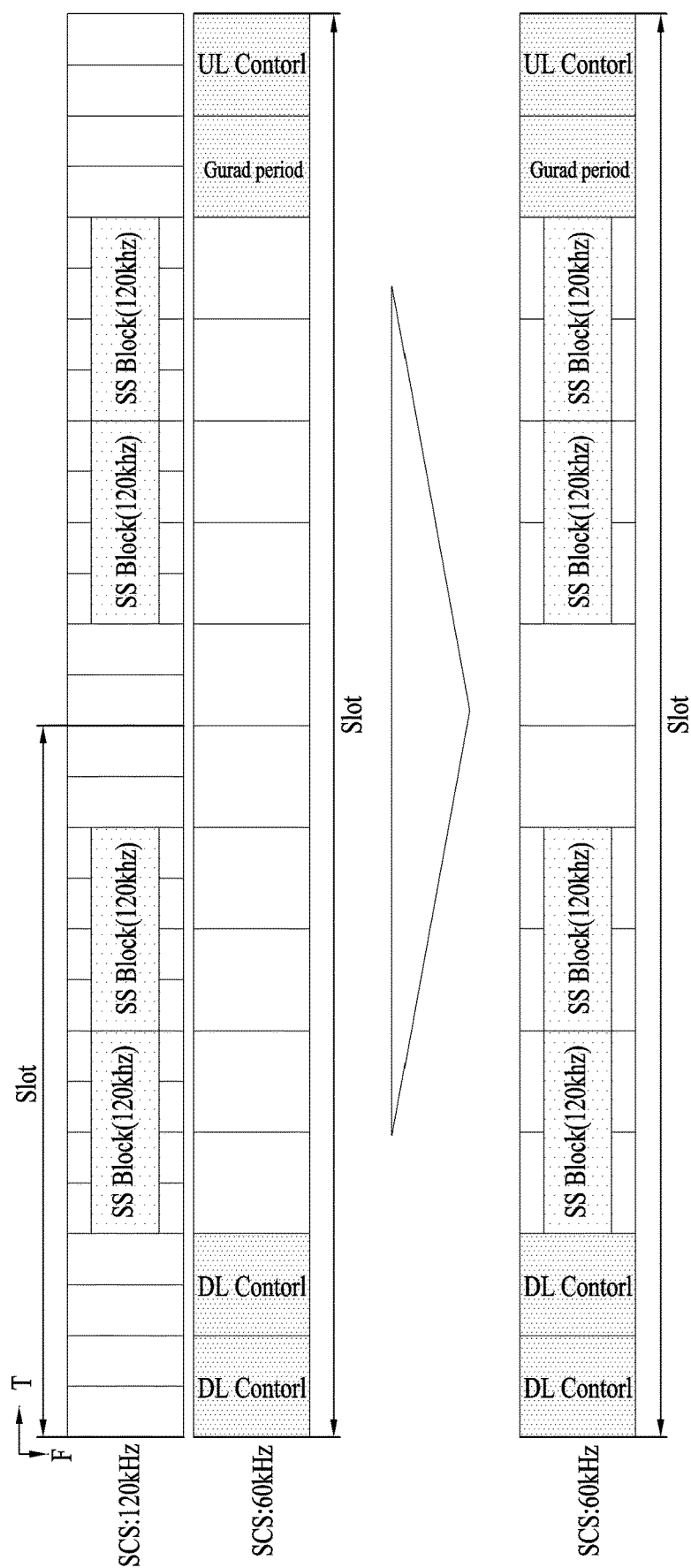

When SSBs having a subcarrier spacing of 120 kHz and data having a subcarrier spacing of 60 kHz are multiplexed in a slot composed of 14 OFDM symbols, the SSBs may be disposed as shown in FIG. 23. In this case, the SSBs having a subcarrier spacing of 120 kHz are disposed not to intrude control regions even when the data subcarrier spacing is 60 kHz or 120 kHz. Here, considering the SS burst configurations and SS burst set configurations shown in FIGS. 22 and 23, a method of disposing SSBs within a 5 ms window may be arranged as follows.

120 kHz Subcarrier Spacing

The first OFDM symbols of candidate SSBs have indexes of $\{4, 8, 16, 20\}+28*n$. Here, $n=0, 1, 2, 3, 5, 6, 7, 8, 10, 11, 12, 13, 15, 16, 17, 18$ for carrier frequencies higher than 6 GHz.

Embodiment 5-2

Figure 24:
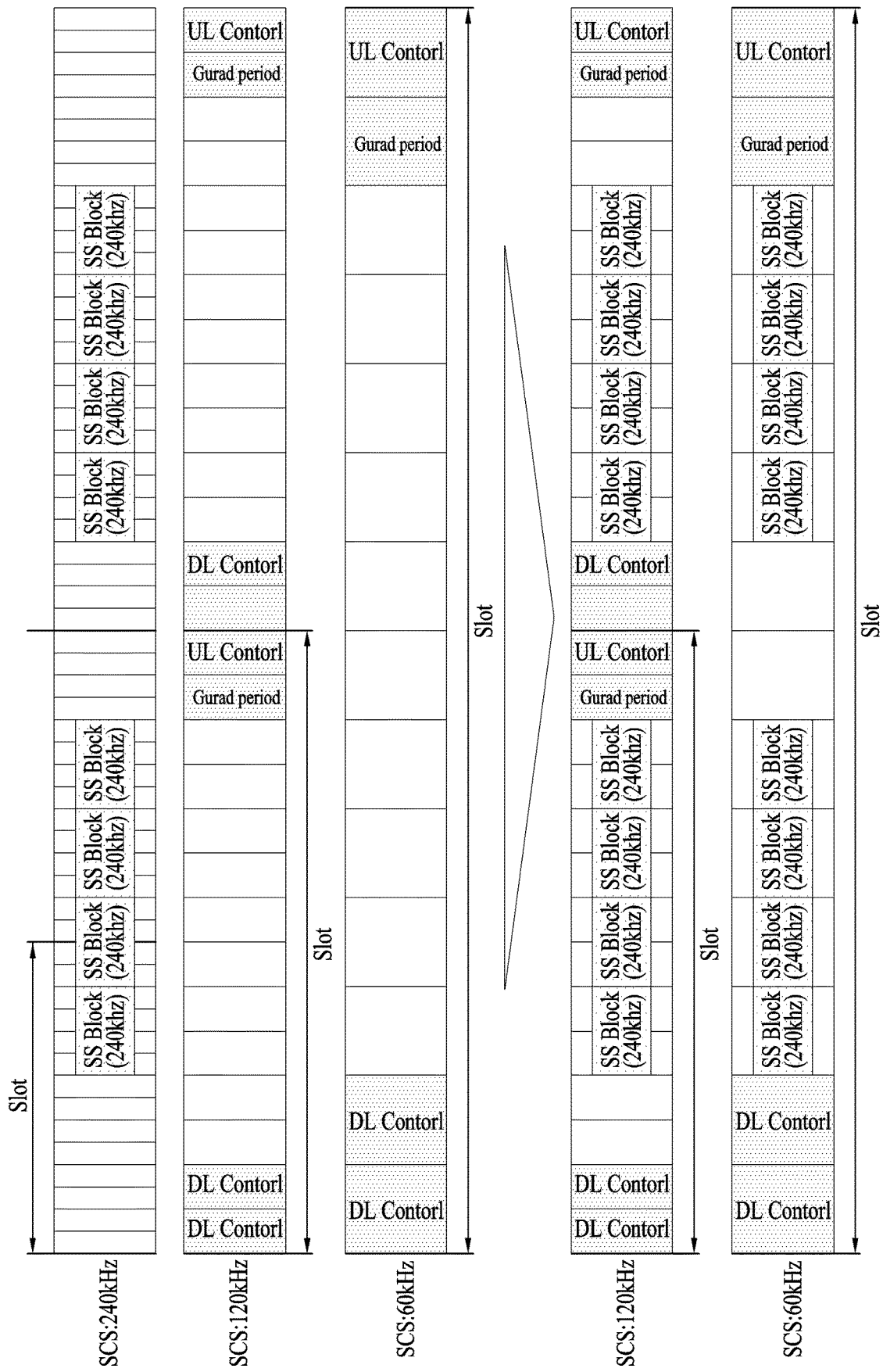

When SSBs having a subcarrier spacing of 240 kHz and data having a subcarrier spacing of 60 kHz or 120 kHz are multiplexed in a slot composed of 14 OFDM symbols, the SSBs may be disposed as shown in FIG. 24. In this case, the SSBs having a subcarrier spacing of 240 kHz are disposed not to intrude control regions.

Here, considering the SS burst configurations and SS burst set configurations shown in FIGS. 22 and 24, a method of disposing SSBs within a 5 ms window may be arranged as follows.

240 kHz Subcarrier Spacing

The first OFDM symbols of candidate SSBs have indexes $\{8, 12, 16, 20, 32, 36, 40, 44\}+56*n$. Here, $n=0, 1, 2, 3, 5, 6, 7, 8$ for carrier frequencies higher than 6 GHz.

Embodiment 5-3

SSB arrangement when SSBs having a subcarrier spacing of 120 kHz or 240 kHz and data having a subcarrier spacing of 60 kHz are multiplexed in a slot composed of 14 OFDM symbols has been described in embodiments 5-1 and 5-2. Further, when all SS burst configurations and SS burst set configurations are considered, control regions of data having a subcarrier spacing of 60 kHz may not be guaranteed as shown in FIG. 26 in the case of a specific SS burst set as shown in FIG. 25.

Figure 25:
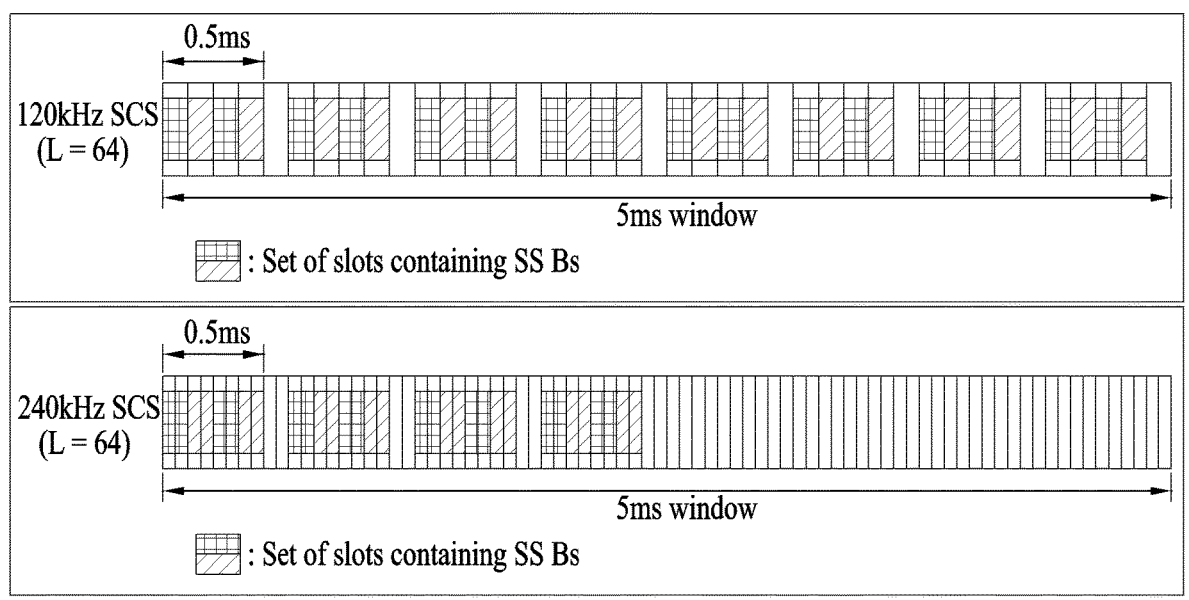
Figure 26:
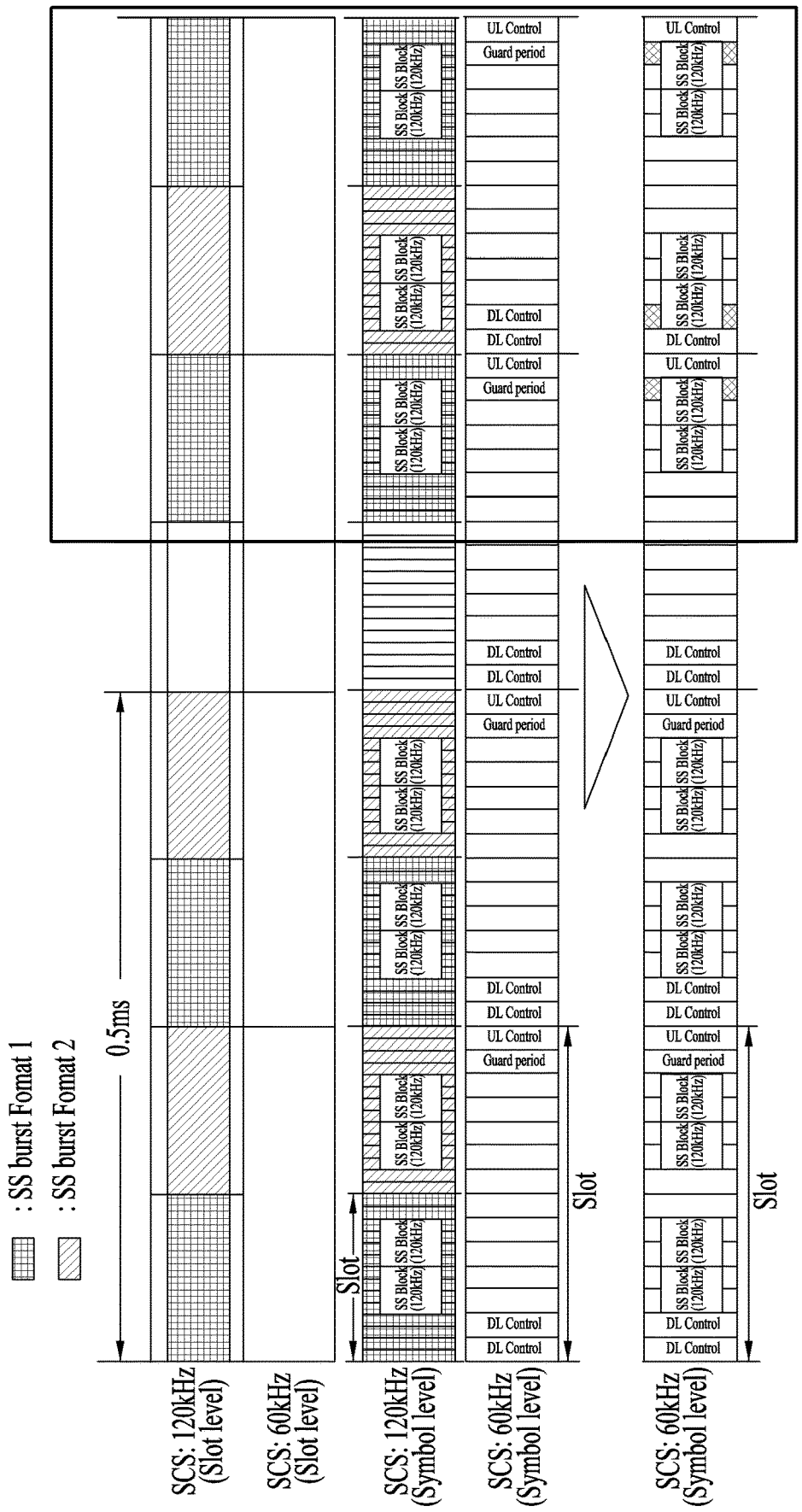

In other words, if an SS burst set is configured as shown in FIG. 25 and an SS burst is configured as in embodiment 5-1, a gap period for uplink control transmission or a downlink control symbol may overlap with SSBs, as shown in FIG. 26.

Figure 27:
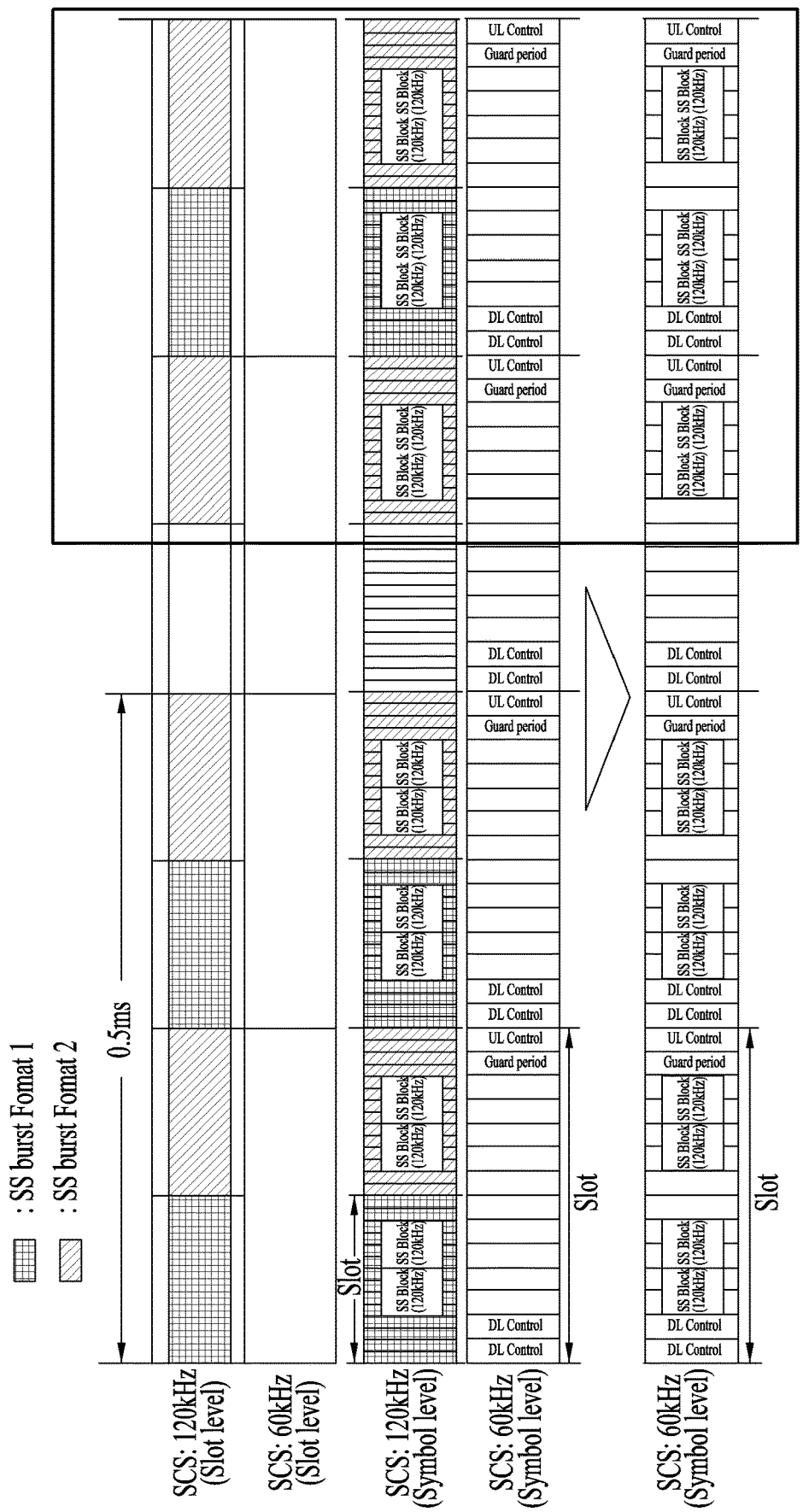

Accordingly, to guarantee a guard period for uplink control and 2 downlink control symbols in a specific SS burst set configuration and SS burst configuration, the SS burst set configuration shown in FIG. 26 may be reconfigured as shown in FIG. 27. In addition, when the SBS subcarrier spacing is 240 kHz, SSBs may be disposed corresponding to positions of SSBs having a subcarrier spacing of 120 kHz. For example, 2 SSBs having a subcarrier spacing of 240 kHz may be disposed in a duration corresponding to one SSB having a subcarrier spacing of 120 kHz.

Figure 28:
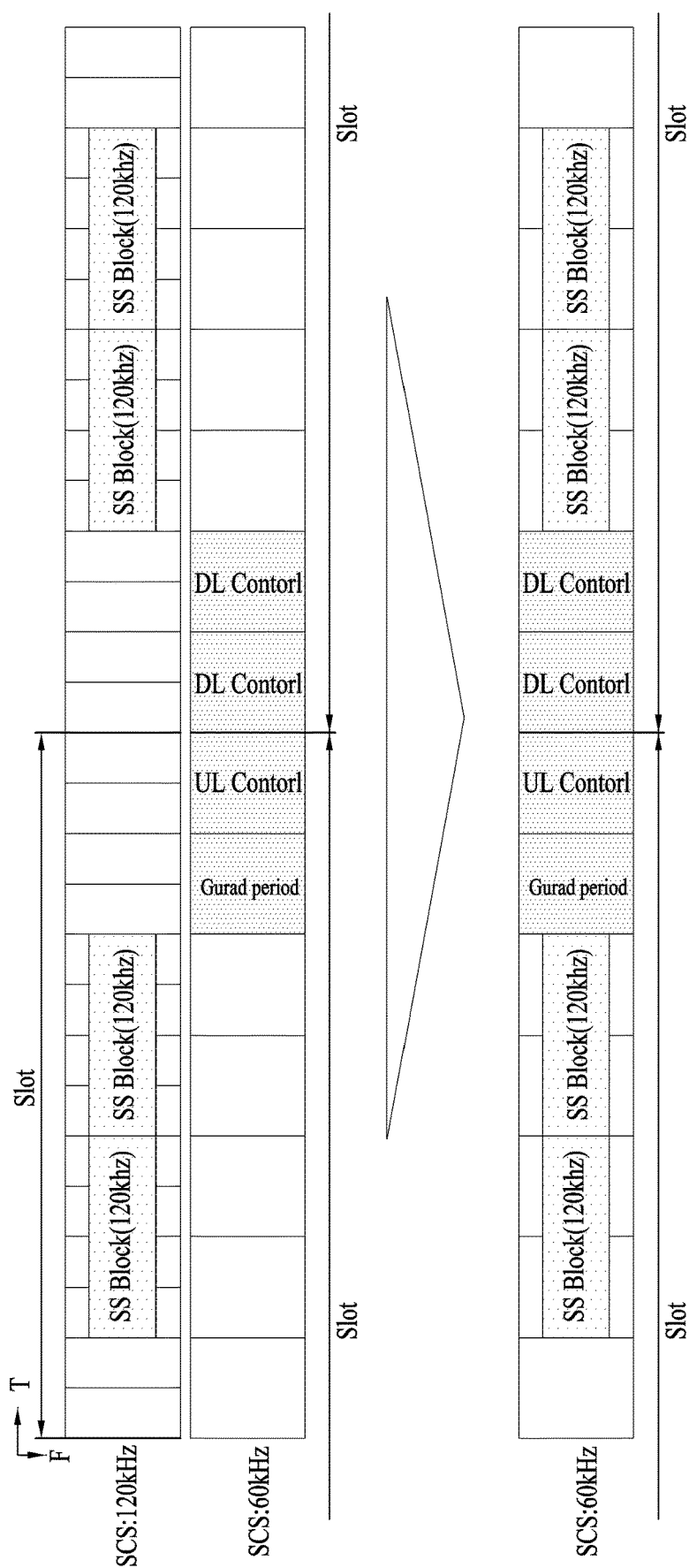
Figure 29:
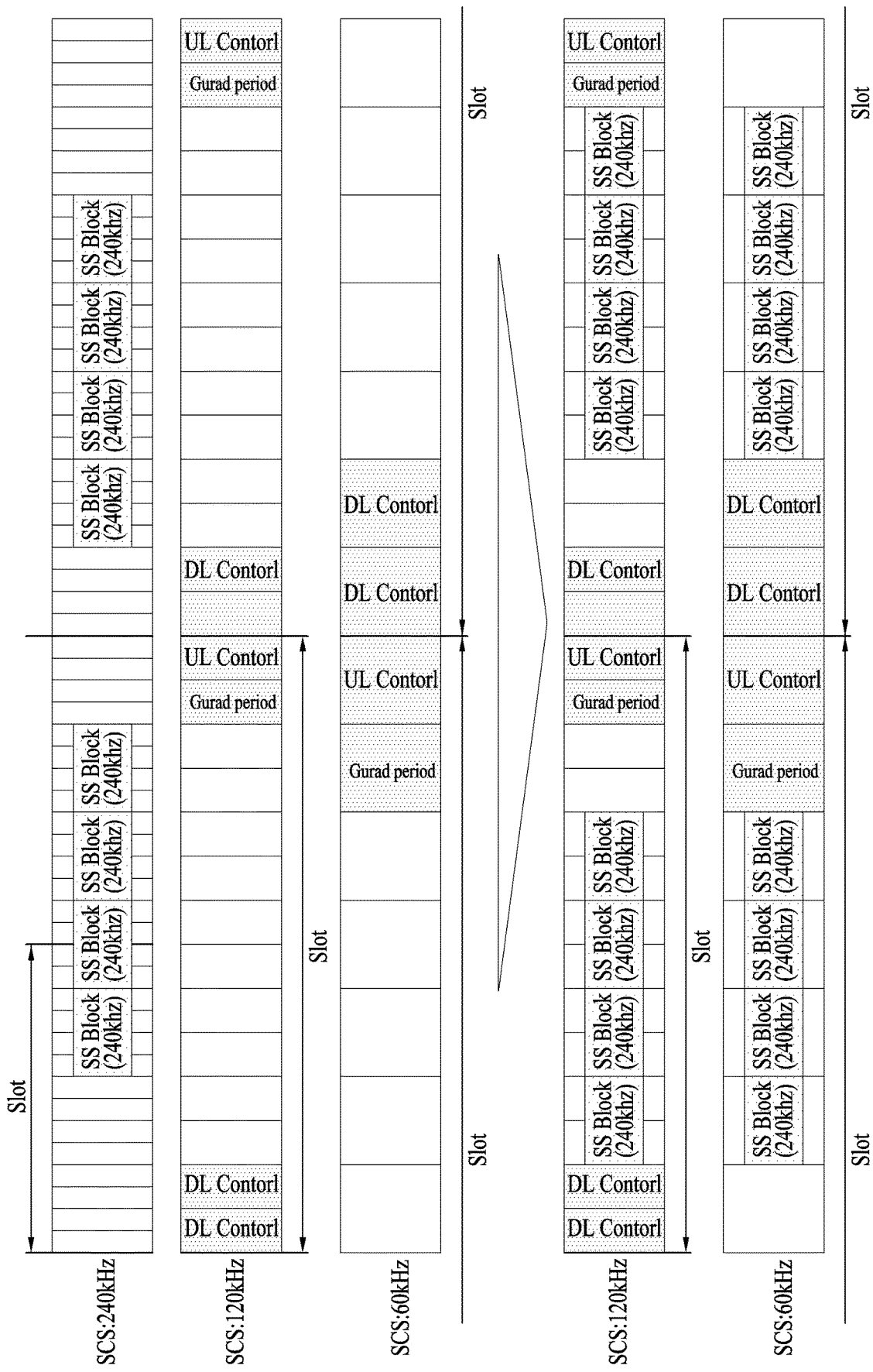

That is, when SSBs are disposed from the middle part of a slot having a 60 kHz subcarrier spacing, SS burst set configuration may be represented as shown in FIGS. 28 and 29. Here, FIG. 28 shows a case in which an SSB subcarrier spacing is 120 kHz and FIG. 29 shows a case in which an SSB subcarrier spacing is 240 kHz.

Here, considering the SS burst configurations and SS burst set configurations shown in FIGS. 25 and 27 to 29, a method of disposing SSBs within a 5 ms window may be arranged as follows.

120 kHz Subcarrier Spacing

The first OFDM symbols of candidate SSBs have indexes $\{4, 8, 16, 20, 32, 36, 44, 48\}+70*n$. Here, $n=0, 2, 4, 6$ for carrier frequencies higher than 6 GHz.

The first OFDM symbols of candidate SSBs have indexes $\{2, 6, 18, 22, 30, 34, 46, 50\}+70*n$. Here, $n=1, 3, 5, 7$ for carrier frequencies higher than 6 GHz.

240 kHz Subcarrier Spacing

The first OFDM symbols of candidate SSBs have indexes $\{8, 12, 16, 20, 32, 36, 40, 44, 64, 68, 72, 76, 88, 92, 96, 100\}+140*n$. Here, $n=0, 2$ for carrier frequencies higher than 6 GHz.

The first OFDM symbols of candidate SSBs have indexes $\{4, 8, 12, 16, 36, 40, 44, 48, 60, 64, 68, 72, 92, 96, 100, 104\}+140*n$. Here, $n=1, 3$ for carrier frequencies higher than 6 GHz.

When an SS burst is configured as described above, symbols in which SSBs are transmitted are fixed irrespective of subcarrier spacing in bands of 6 GHz or higher. That is, SSBs may be transmitted in third to sixth and ninth to twelfth symbols when a slot subcarrier spacing is 60 kHz, and SSBs may be transmitted in symbols aligned in time with symbol positions at which SSBs are transmitted in a slot having a 60 kHz subcarrier spacing when the SSBs have a subcarrier spacing of 120 kHz and 240 kHz from the viewpoint of SSBs.

Accordingly, when a UE detects an SSB based on the above description, the UE may estimate positions of remaining SSBs. Furthermore, SSBs may be used for measurement using such information. If SSB combining is permitted in an SS burst, an additional combining gain may be obtained.

<Method of Indicating Actually Transmitted Synchronization Signal Block (ATSS)>

6. Method of Generally Indicating ATSS

Hereinafter, methods of indicating an ATSS to a UE in a system supporting NR (New RAT) will be described. In the current NR, all SSBs are positioned within a 5 ms window irrespective of periodicity of SS burst sets. The number of SSBs that need to be positioned in 5 ms is defined according to frequency range.

That is, a maximum of 4 SSBs is disposed in 5 ms in bands of 3 GHz or lower and a maximum of 8 SSBs is disposed in 5 ms in bands of 3 GHz to 6 GHz. A maximum of 64 SSBs may be disposed in 5 ms in bands of 6 GHz or higher.

In addition, SSBs may have a subcarrier spacing of 15 kHz or 30 kHz in bands of 6 GHz or lower and 120 kHz or 240 kHz in bands of 6 GHz or higher. Meanwhile, positions at which SSBs can be transmitted in an SS burst set are defined per subcarrier spacing in standard documents.

It is assumed that an ATSS is indicated through remaining minimum system information (RMSI) or other system information (OSI) in the present embodiment.

To signal ATSS information about a maximum of 64 SSBs, there are a method of signaling only the number of transmitted SSBs and a method of signaling information about all positions using a bitmap. According to the method of signaling only the number of ATSSs, ATSSs may be indicated using only 6 bits but flexibility with respect to SSB transmission of a gNB decreases. On the contrary, the method using a bitmap provides full flexibility to the gNB but requires a maximum of 64 bits.

However, allocation of a 64-bit resource to all neighbor cells may cause considerable overhead. Accordingly, various ATSS indication methods for efficiently indicating an ATSS need to be considered. Therefore, methods of indicating an ATSS in a system supporting NR are described in the present embodiment.

Figure 30:
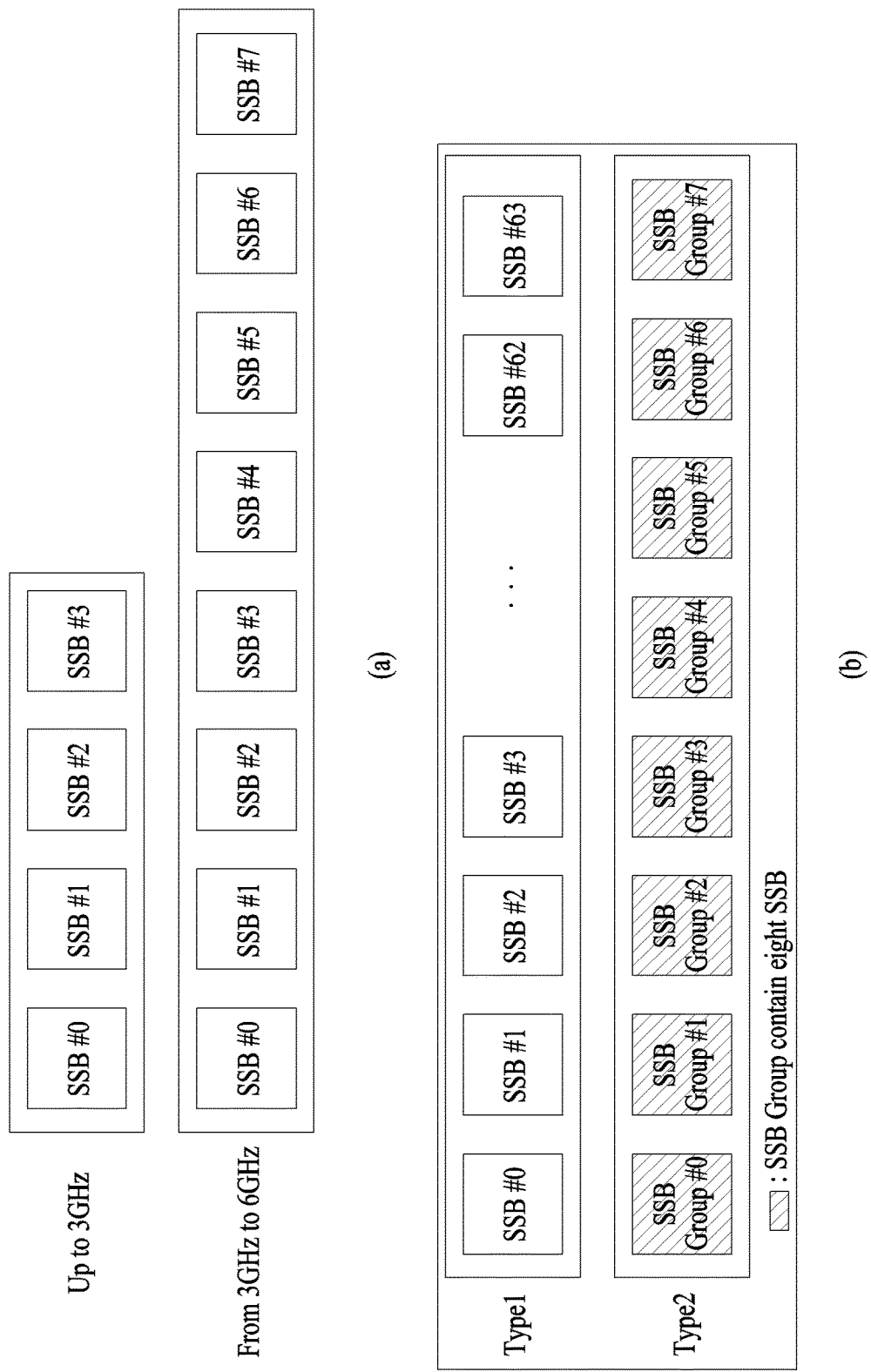

A maximum number of SSBs that can be transmitted in frequency bands of 3 GHz or lower is 4 and a maximum number of SSBs that can be transmitted in frequency bands of 3 GHz to 6 GHz is 8. Positions at which SSBs can be transmitted per frequency band may be defined as shown in FIG. 30(a). Now, specific methods for indicating an ATSS will be described.

Embodiment 6-1

This is a method of indicating only a total number of transmitted SSBs. That is, a maximum of 4 SSBs is transmitted in bands of 3 GHz or lower and thus 2 bits are required, and a maximum of 8 SSBs is transmitted in frequency bands of 3 GHz to 6 GHz and thus 3 bits are required. In this case, flexibility in SSB transmission decreases although a small number of bits is used. That is, a gNB needs to sequentially transmit the total number of SSBs from SSB #0 because the gNB knows only the total number of SSBs. For example, if the number of transmitted SSBs is 3, SSB #0, SSB #1 and SSB #2 are transmitted in FIG. 30(a).

Embodiment 6-2

This is a method of indicating information about transmitted SSBs using a bitmap. That is, a maximum of 4 SSBs is transmitted in bands of 3 GHz or lower and thus 4 bits are used, and a maximum of 8 SSBs is transmitted in frequency bands of 3 GHz to 6 GHz and thus 8 bits are used. In this case, full flexibility in SSB transmission can be provided although the number of used bits increases compared to embodiment 6-1. That is, a gNB may select desired SSBs from SSBs #0 to #7 and transmit the selected SSBs because 1 bit is allocated per SSB index.

However, a maximum number of SSBs is 64 in frequency bands of 6 GHz or higher and positions at which SSBs can be transmitted in bands of 6 GHz or higher are defined as type 1 or type 2 of FIG. 30(b). To perform full flexible transmission through a bitmap as in bands of 6 GHz or lower, 64 bits are required. The number of 64 bits may act as considerable overhead even though ATSS indication is performed using RMSI/OSI. Accordingly, an ATSS may be indicated through methods of embodiments 6-3 to 6-7 to provide maximum flexibility with a smaller number of bits although full flexibility cannot be supported.

Embodiment 6-3

This is a method of indicating only a total number of transmitted SSBs. That is, a maximum of 64 SSBs is transmitted in bands of 6 GHz or higher and thus 6 bits are used. In this case, flexibility in SSB transmission decreases although a small number of bits is used. That is, a gNB needs to transmit the total number of SSBs from SSB #0 because the gNB knows only the total number of SSBs. For example, referring to type 1 of FIG. 30(b), if the number of transmitted SSBs is 16, 16 SSBs of SSB #0 to SSB #15 are transmitted.

Embodiment 6-4

Only the total number of transmitted SSBs is indicated and SSBs to be transmitted may be divided into SSB groups and transmitted. In the present embodiment, it is assumed that a single SSB group includes 8 SSBs as in type 2 of FIG. 20(b). 6 bits are required for a gNB to signal information about the number of ATSSs among 64 SSBs to a UE, and the number of actually transmitted SSBs per SSB group may be recognized using the information. The number of actually transmitted SSBs is calculated through the following equation 1.

$$\text{\# of actually transmitted } SSB = \qquad \text{[Equation 1]}$$
$$N\text{\# of actually transmitted } SSB \text{ per } SSB \text{ Group} =$$
$$\begin{cases} \left\lfloor \frac{N}{8} \right\rfloor, & \text{if } SSB \text{ Group index} \geq N - 8*\left\lfloor \frac{N}{8} \right\rfloor \\ \left\lfloor \frac{N}{8} \right\rfloor + 1, & \text{if } SSB \text{ Group index} < N - 8*\left\lfloor \frac{N}{8} \right\rfloor \end{cases}$$

Here, when the number of ATTSs per SSB group is indicated, it may be assumed that ATSSs are sequentially transmitted from the start of an SSB group.

Embodiment 6-5

An ATSS may be indicated by indicating information related to SSB group transmission using a bitmap and indicating information about the number of SSBs in an SSB group using bits other than the bitmap.

For example, 64 SSBs may be divided into 8 SSB groups as in type 2 of FIG. 30(b) and an 8-bit bitmap may be transmitted to signal information about SSB groups used for ATSS transmission to a UE. When regions at which SSBs can be transmitted are defined as type 2 of FIG. 30(b), there is an advantage that boundaries of SSB groups are aligned with boundaries of slots having a 60 kHz subcarrier spacing when SSBs are multiplexed with the slots having the 60 kHz subcarrier spacing. Accordingly, when whether SSB groups are used using a bitmap, the UE is able to know whether SSBs are transmitted per slot for all subcarrier spacings in frequency bands of 6 GHz or higher.

Further, for ATSS indication, additional information for indicating which SSB among 8 SSBs in each SSB group is transmitted is required. Accordingly, a method of signaling information about how many SSBs are used among 8 SSBs included in an SSB group using additional bits may be used. Here, 3 bits are necessary to signal information about the number of actually used SSBs among the 8 SSBs included in a group and the corresponding information needs to be equally applied to all SSB groups.

For example, if SSB Group #0 and SSB Group #1 are indicated through bitmap information and transmission of 3 SSBs in an SSB group is indicated through the 3-bit information, SSB Group #0 and SSB Group #1 respectively include 3 SSBs and thus a total number of ATSSs is 6. Here, SSBs are sequentially disposed in the SSB group from the position of the foremost candidate SSB.

If 8-bit bitmap information for indicating a used SSB group is 00000000 (all zero), an indication method different from embodiment 6-5 may be applied. This will be described in detail through embodiment 7 which will be described later.

Embodiment 6-6

An ATSS may be indicated by indicating information related to SSB group transmission using a bitmap and indicating information about the number of SSBs in an SSB group using bits other than the bitmap.

For example, 64 SSBs may be divided into 8 SSB groups as in type 2 of FIG. 30(b) and an 8-bit bitmap may be transmitted to signal information about SSB groups used for ATSS transmission to a UE. When regions at which SSBs can be transmitted are defined as type 2 of FIG. 30(b), there is an advantage that boundaries of SSB groups are aligned with boundaries of slots having a 60 kHz subcarrier spacing when SSBs are multiplexed with the slots having the 60 kHz subcarrier spacing. Accordingly, when whether SSB groups are used using a bitmap, the UE is able to know whether SSBs are transmitted per slot for all subcarrier spacings in frequency bands of 6 GHz or higher.

For ATSS indication, additional information for indicating which SSB among 8 SSBs in each SSB group is transmitted is required. Accordingly, a method of signaling information about how many SSBs are used among 8 SSBs included in an SSB group using additional bits may be used. 6 bits are necessary to signal information about the number of actually used SSBs among the 64 SSBs, and the number of transmitted ATSSs in an SSB group may be recognized using the corresponding information. This is calculated through the following equation 2.

$$\begin{aligned} \text{\# of actually transmitted } SSB \text{ Group} = \quad & \text{[Equation 2]} \\ B(\text{define actually transmitted SSB Group index:} \\ AT\,SSB \text{ Group \#0} \sim AT\,SSB \text{ Group \#}B\text{-1}) \\ \text{\# of actually transmitted } SSB = \\ N\text{\# of actually transmitted } SSB \text{ per } SSB \text{ Group} = \\ \begin{cases} \left\lfloor \frac{N}{B} \right\rfloor, & \text{if } AT\,SSB \text{ Group index} \geq N - B * \left\lfloor \frac{N}{B} \right\rfloor \\ \left\lfloor \frac{N}{B} \right\rfloor + 1, & \text{if } AT\,SSB \text{ Group index} < N - B * \left\lfloor \frac{N}{B} \right\rfloor \end{cases} \end{aligned}$$

Here, when the number of ATSSs per SSB group is indicated, it may be assumed that ATSSs are sequentially transmitted from the start of each SSB group.

If 8-bit bitmap information for indicating a used SSB group is 00000000 (all zero), an indication method different from embodiment 6-6 may be applied. This will be described in detail through embodiment 7 which will be described later.

Embodiment 6-7

An ATSS may be indicated by indicating information related to SSB group transmission using a bitmap and indicating whether SSBs in an SSB group are transmitted using bits other than the bitmap.

For example, 64 SSBs may be divided into 8 SSB groups as in type 2 of FIG. 30(b) and an 8-bit bitmap may be transmitted to signal information about SSB groups used for ATSS transmission to a UE. When regions at which SSBs can be transmitted are defined as type 2 of FIG. 30(b), there is an advantage that boundaries of SSB groups are aligned with boundaries of slots having a 60 kHz subcarrier spacing when SSBs are multiplexed with the slots having the 60 kHz subcarrier spacing. Accordingly, when whether SSB groups are used using a bitmap, the UE is able to know whether SSBs are transmitted per slot for all subcarrier spacings in frequency bands of 6 GHz or higher.

Further, for ATSS indication, additional information for indicating which SSB among 8 SSBs in each SSB group is transmitted is required. Accordingly, information about which SSBs among 8 SSBs included in an SSB group are transmitted may be signaled using a bit map. In this case, 8 bits are necessary because bitmap information about 8 SSBs included in an SSB group needs to be transmitted and the corresponding information needs to be equally applied to all SSB groups. For example, if use of SSB Group #0 and SSB Group #1 is indicated through a bitmap about SSB groups and transmission of the first and fifth SSBs in an SSB group is indicated through a bitmap about SSBs, the first and fifth SSBs in SSB Group #0 and SSB Group #1 are transmitted and thus a total number of ATSSs is 4.

If 8-bit bitmap information for indicating a used SSB group is 00000000 (all zero), an indication method different from embodiment 6-7 may be applied. This will be described in detail through embodiment 7 which will be described later.

When an ATSS is indicated as in embodiments 6-1 to 6-7, an offset with respect to an SSB position in a 5 ms window may also be indicated. In addition, UEs may assume that there is no ATSS in a duration corresponding to the indicated offset. Meanwhile, although cells included in a cell list transmitted to UEs may use the above-described indication methods of embodiments 6-1 to 6-7, a default format for cases in which a cell which is not included in the cell list is detected may be defined. Further, a procedure for re-checking ATSS information signaled to UEs through RMSI or OSI through UE dedicated RRC signaling may be required. For example, when an SSB group including ATSSs is indicated using 8 bits and then ATSS indexes in the indicated SSB group are indicated using 8 bits as in embodiment 6-7, a procedure for re-checking the ATSSs using a full bitmap through RRC signaling may be performed similarly to embodiment 6-2.

7. Methods of Indicating ATSS Under Specific Conditions

Embodiment 7 describes ATSS indication mechanisms which can be used when the 8-bit bitmap for SSB group indication is 00000000 (all zero) in the above-described embodiments 6-5 to 6-7, as shown in FIG. 31. Here, bits other than 8 bits for SSB group indication may be used for ATSS indication. That is, referring to FIG. 31, bits included in "bit for actual transmit SSB indication in SSB group" part may be used. Specific ATSS indication mechanisms are described through embodiments 7-1 to 7-4.

Embodiment 7-1

Locations of ATSSs may be defined in the form of a pattern. When the number of bits in the "bit for actual transmit SSB indication in SSB group" part of FIG. 31 is K, at least one of a maximum of $2^K$ patterns may be indicated using the K bits. When the pattern is indicated, a UE may operate on the assumption that ATSSs are transmitted in the pattern.

Embodiment 7-2

An SSB group used for ATSSs among SSB groups is indicated to the UE using K bits as a bitmap. The UE operates on the assumption that 8 SSBs which can be included in the indicated SSB group are all ATSS.

Embodiment 7-3

An SSB which is an ATSS among initial K SSBs is indicated to the UE using K bits as a bitmap. The UE operates on the assumption that the SSB is repeatedly transmitted in a 5 ms window using the indicated K pieces of ATSS information as a pattern.

Embodiment 7-4

ATSS periodicity and a total number of transmitted ATSSs may be indicated using K bits. Some of the K bits are used to indicate ATSS periodicity and the remaining bits are used to indicate the number of ATSSs. Accordingly, the UE may acquire location information of ATSSs through the ATSS periodicity and information about the number of ATSSs.

When an ATSS is indicated as in embodiments 7-1 to 7-4, an offset with respect to SSB location within a 5 ms window may also be indicated. The UE may assume that there is no ATSS in a duration corresponding to the indicated offset.

Figure 32:
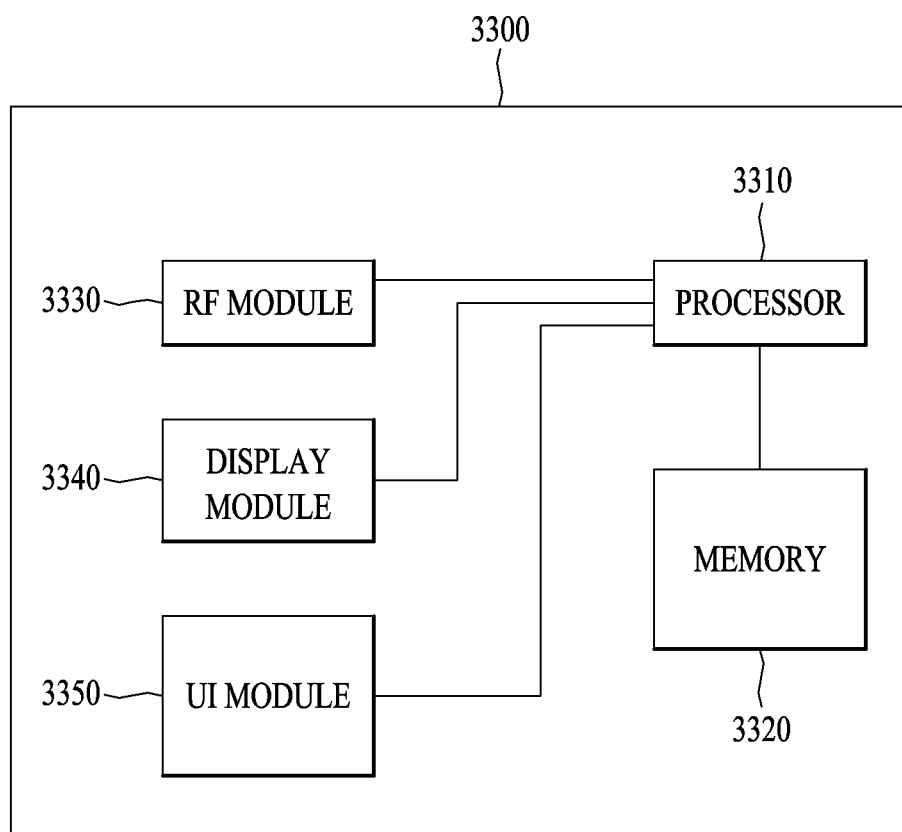
FIG. 32 is a block diagram of a communication apparatus according to an embodiment of the present disclosure.

Referring to FIG. 32, a communication apparatus 3300 includes a processor 3310, a memory 3320, an RF module 3330, a display module 3340, and a User Interface (UI) module 3350.

The communication device 3300 is shown as having the configuration illustrated in FIG. 32, for the convenience of description. Some modules may be added to or omitted from the communication apparatus 3300. In addition, a module of the communication apparatus 3300 may be divided into more modules. The processor 3310 is configured to perform operations according to the embodiments of the present disclosure described before with reference to the drawings. Specifically, for detailed operations of the processor 3310, the descriptions of FIGS. 1 to 31 may be referred to.

The memory 3320 is connected to the processor 3310 and stores an Operating System (OS), applications, program codes, data, etc. The RF module 3330, which is connected to the processor 3310, upconverts a baseband signal to an RF signal or downconverts an RF signal to a baseband signal. For this purpose, the RF module 3330 performs digital-to-analog conversion, amplification, filtering, and frequency upconversion or performs these processes reversely. The display module 3340 is connected to the processor 3310 and displays various types of information. The display module 3340 may be configured as, not limited to, a known component such as a Liquid Crystal Display (LCD), a Light Emitting Diode (LED) display, and an Organic Light Emitting Diode (OLED) display. The UI module 3350 is connected to the processor 3310 and may be configured with a combination of known user interfaces such as a keypad, a touch screen, etc.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method for transmitting and receiving a synchronization signal block and the apparatus therefor have been described focusing on examples in which they are applied to 5G NewRAT, the method and the apparatus may be applied to various wireless communication systems in addition to 5G NewRAT.

The invention claimed is:
1. A method for receiving a synchronization signal block (SSB) by a UE in a wireless communication system, the method comprising:
receiving, from a base station (BS), at least one SSB mapped to a plurality of symbols; and
transmitting, to the BS, synchronization signal information determined based on the at least one SSB,
wherein a first and a second regions for candidate SSBs in which the at least one SSB can be received are allocated in a unit region,
wherein the unit region is composed of a plurality of slots including the plurality of symbols,
wherein a number of symbols between the first and the second regions, a number of symbols before the first region and a number of symbols after the second region are same in the unit region, wherein the unit region is consecutively disposed by 4 times, and then consecutively disposed again by 4 times after a specific time interval within a half frame, and wherein the specific time interval is same with a time duration corresponding to the unit region.

2. The method according to claim 1, wherein the candidate SSBs are consecutively disposed by a first number in each of the first and the second regions.

3. The method according to claim 1, wherein the number of symbols is 4 when a subcarrier spacing of the SSB is a first value, and the number of symbols is 8 when the subcarrier spacing of the SSB is a second value.

4. The method according to claim 1, wherein unit region set in which the unit region is consecutively disposed by 4 times is repeatedly disposed by 4 times at the specific time interval within the half frame when the subcarrier spacing of the SSB is the first value, the regions being repeatedly disposed four times.

5. The method according to claim 1, wherein the unit region is composed by 2 slots when the subcarrier spacing of the SSB is the first value, and the unit region is composed by 4 slots when the subcarrier spacing of the SSB is the second value.

6. The method according to claim 1, wherein a frequency band in which the UE operates is greater than a specific value.

7. A UE receiving a synchronization signal block (SSB) in a wireless communication system, the UE comprising:

a transceiver for transmitting/receiving signals to/from a base station; and a processor connected to the transceiver is configured to:

control the transceiver to receive at least one SSB mapped to a plurality of symbols from a base station (BS), control the transceiver to transmit synchronization signal information obtained based on the at least one SSB to the BS, wherein a first and a second region for candidate SSBs in which the at least one SSB can be received are allocated in a unit region, wherein the unit region is composed of a plurality of slots including the plurality of symbols, wherein a number of symbols between the first and the second regions, a number of symbols before the first region and a number of symbols after the second region are same in the unit region, wherein the unit region is consecutively disposed by 4 times, and then consecutively disposed again by 4 times after a specific time interval within a half frame, and wherein the specific time interval is same with a time duration corresponding to the unit region.

8. A method for transmitting a synchronization signal block (SSB) by a base station (BS) in a wireless communication system, the method comprising:

transmitting, to a user equipment (UE), at least one SSB mapped to a plurality of symbols; and receiving, from the UE, synchronization signal information determined based on the at least one SSB, wherein a first and a second regions for candidate SSBs in which the at least one SSB can be received are allocated in a unit region, wherein the unit region is composed of a plurality of slots including the plurality of symbols, wherein a number of symbols between the first and the second regions, a number of symbols before the first region and a number of symbols after the second region are same in the unit region, wherein the unit region is consecutively disposed by 4 times, and then consecutively disposed again by 4 times after a specific time interval within a half frame, and wherein the specific time interval is same with a time duration corresponding to the unit region.

9. A base station (BS) transmitting a synchronization signal block (SSB) in a wireless communication system, the BS comprising:

a transceiver for transmitting/receiving signals to/from a UE; and a processor connected to the transceiver is configured to:

control the transceiver to transmit at least one SSB mapped to a plurality of symbols to a user equipment (UE)

control the transceiver to receive transmit synchronization signal information obtained based on the at least one SSB from the UE, wherein a first and a second regions for candidate SSBs in which the at least one SSB can be received are allocated in a unit region, wherein the unit region is composed of a plurality of slots including the plurality of symbols, wherein a number of symbols between the first and the second regions, a number of symbols before the first region and a number of symbols after the second region are same in the unit region, wherein the unit region is consecutively disposed by 4 times, and then consecutively disposed again by 4 times after a specific time interval within a half frame, and wherein the specific time interval is same with a time duration corresponding to the unit region.

* * * * *